(12) United States Patent
Edwards et al.

(10) Patent No.: US 11,073,298 B2
(45) Date of Patent: *Jul. 27, 2021

(54) LOCATIONAL ENVIRONMENTAL CONTROL

(71) Applicants: AT&T Intellectual Property I, L.P., Atlanta, GA (US); AT&T Mobility II LLC, Atlanta, GA (US)

(72) Inventors: Gregory W. Edwards, Austin, TX (US); Michael Lattanzi, Bothell, WA (US); Constance Missimer, Seattle, WA (US); James H. Pratt, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,137

(22) Filed: Apr. 28, 2020

(65) Prior Publication Data
US 2020/0256580 A1 Aug. 13, 2020

Related U.S. Application Data

(63) Continuation of application No. 14/934,845, filed on Nov. 6, 2015, now Pat. No. 10,753,634.

(51) Int. Cl.
*F24F 11/62* (2018.01)
*F24F 11/79* (2018.01)
*F24F 11/30* (2018.01)
*F24F 11/56* (2018.01)
*F24F 110/20* (2018.01)
*F24F 11/58* (2018.01)
*F24F 110/10* (2018.01)

(52) U.S. Cl.
CPC .............. *F24F 11/62* (2018.01); *F24F 11/30* (2018.01); *F24F 11/79* (2018.01); *F24F 11/56* (2018.01); *F24F 11/58* (2018.01); *F24F 2110/10* (2018.01); *F24F 2110/20* (2018.01)

(58) Field of Classification Search
CPC ....................................................... H04W 4/02
See application file for complete search history.

(56) References Cited

U.S. PATENT DOCUMENTS

| | | | |
|---|---|---|---|
| 6,348,867 | B1 | 2/2002 | Myllymaki |
| 6,536,553 | B1 | 3/2003 | Scanlon |
| 8,350,697 | B2 | 1/2013 | Trundle et al. |
| 8,579,205 | B2 | 11/2013 | Augusto et al. |
| 8,840,033 | B2 | 9/2014 | Steinberg |

(Continued)

OTHER PUBLICATIONS

Bogard, Travis, "Jawbone now works with Nest." Jun. 23, 2014. https://jawbone.com/blog/jawbone-up-works-with-nest/, 3 pages.
Scalars and Vectors, NAA, May 15, 2017, p. 1.

*Primary Examiner* — Santosh R Poudel
(74) *Attorney, Agent, or Firm* — Guntin & Gust, PLC; Robert Gingher

(57) ABSTRACT

Directional environmental control provides nearly immediate comfort. A location associated with a mobile device determines an air terminal that best serves the location. Conditioned air may thus be streamed from the air terminal to the location associated with the mobile device. The conditioned air may be heated or cooled according to a profile associated with a user of the mobile device.

20 Claims, 30 Drawing Sheets

(56) References Cited

U.S. PATENT DOCUMENTS

| | | |
|---|---|---|
| 8,849,610 B2 | 9/2014 | Molettiere et al. |
| 9,374,874 B1 | 6/2016 | Ewing |
| 9,696,055 B1 | 7/2017 | Goodman |
| 2002/0019213 A1 | 2/2002 | Yoshinori |
| 2005/0103876 A1* | 5/2005 | Martinez ............ B60H 1/00742 236/94 |
| 2009/0065596 A1 | 3/2009 | Seem et al. |
| 2009/0090125 A1 | 4/2009 | Seki |
| 2012/0310417 A1 | 12/2012 | Enohara |
| 2012/0313746 A1 | 12/2012 | Rahman et al. |
| 2013/0199772 A1 | 8/2013 | Fischer |
| 2013/0234840 A1 | 9/2013 | Trundle |
| 2013/0245837 A1 | 9/2013 | Grohman |
| 2014/0085101 A1 | 3/2014 | Rahman et al. |
| 2014/0146170 A1 | 5/2014 | Tofighbakhsh |
| 2014/0156084 A1 | 6/2014 | Rahman et al. |
| 2014/0207292 A1 | 7/2014 | Ramagem et al. |
| 2014/0260372 A1 | 9/2014 | Woods |
| 2014/0330396 A1 | 11/2014 | Chang et al. |
| 2014/0365017 A1 | 12/2014 | Hanna et al. |
| 2015/0195099 A1 | 7/2015 | Imes et al. |
| 2015/0220109 A1 | 8/2015 | von Badinski et al. |
| 2015/0222450 A1 | 8/2015 | Ko et al. |
| 2015/0223705 A1 | 8/2015 | Sadhu |
| 2015/0241860 A1 | 8/2015 | Raid |
| 2016/0040902 A1 | 2/2016 | Shah |
| 2016/0137028 A1 | 5/2016 | Trego |
| 2016/0174723 A1 | 6/2016 | Chan |
| 2016/0363341 A1 | 12/2016 | Arens |
| 2016/0364612 A1 | 12/2016 | Dixon |
| 2018/0038609 A1* | 2/2018 | Kuroiwa .................. F24F 11/30 |

\* cited by examiner

LOCATIONAL ENVIRONMENTAL CONTROL

CROSS-REFERENCE TO RELATED APPLICATION

This application is a continuation of U.S. application Ser. No. 14/934,845 filed Nov. 6, 2015 and since issued as U.S. patent Ser. No. 10,753,634, which is incorporated by reference herein in its entirety.

BACKGROUND

HVAC systems are common in homes and businesses. These conventional climate control systems (commonly called heating, ventilating, and air conditioning or "HVAC" systems) establish comfortable ambient conditions for occupants. These conventional climate control systems, though, are unsuited to today's mobile communications environment.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
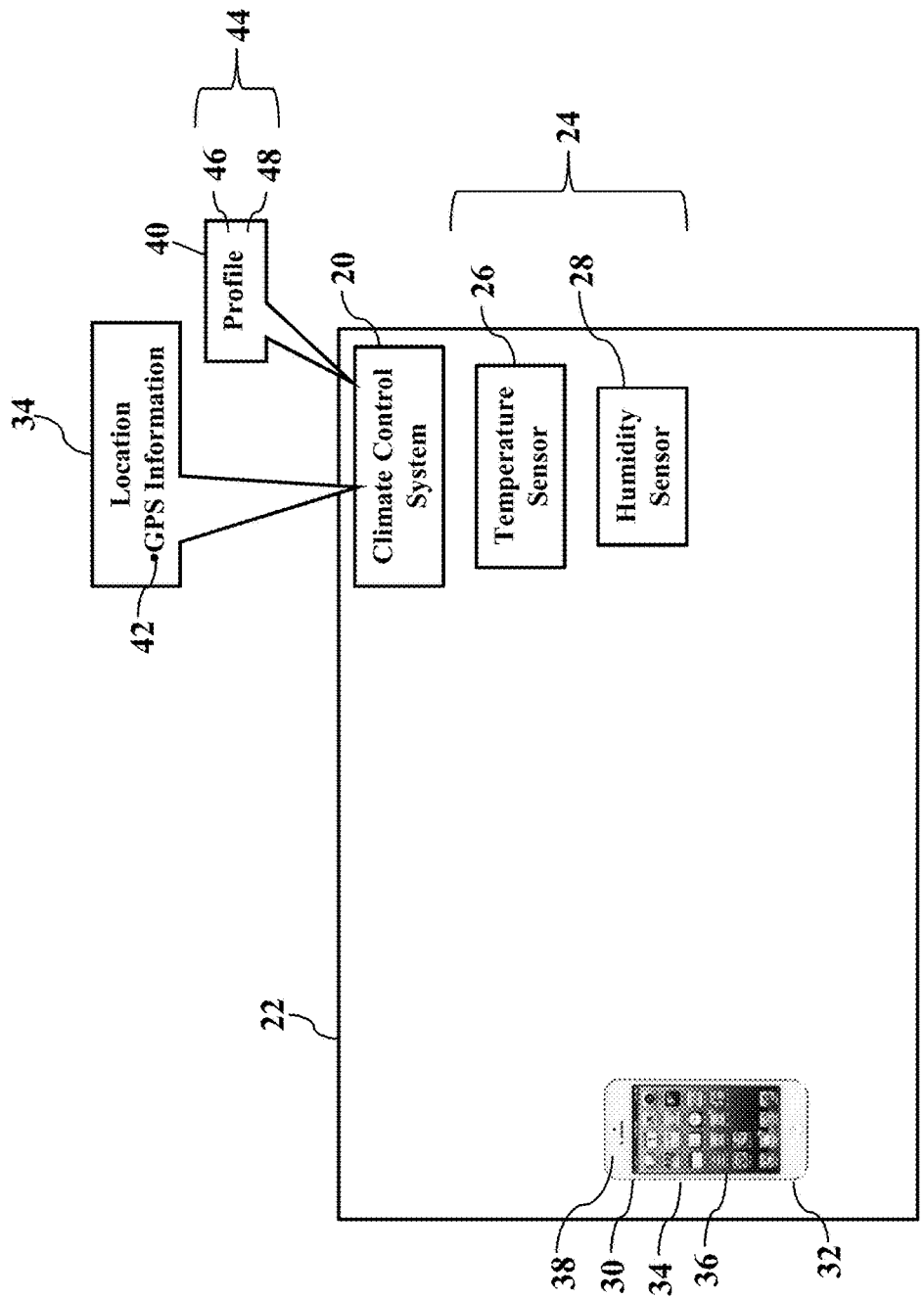
FIGS. 1-7 are simplified illustrations of an environment in which exemplary embodiments may be implemented.

FIGS. 1-7 are simplified illustrations of an environment in which exemplary embodiments may be implemented. FIG. 1 illustrates a climate control system 20 monitoring an environment, such as a room 22 in a home or business. The climate control system 20 heats or cools the room 22, which some readers may know as a heating, ventilating, and air conditioning ("HVAC") system. As the reader likely understands, the climate control system 20 interfaces with sensors 24 to heat or cool the room 22. FIG. 1, for example, illustrates a temperature sensor 26 and a humidity sensor 28. The sensors 24 generate output signals that are used to activate the climate control system 20 to heat or cool the room 22.

Here, though, exemplary embodiments are adapted to the mobile environment. That is, the climate control system 20 may interface with mobile devices 30 when heating or cooling. FIG. 1, for example, illustrates a mobile smartphone 32, which many people carry. The climate control system 20, though, may monitor and track any mobile device, as later paragraphs will explain. The climate control system 20 obtains a location 34 of the smartphone 32 and heats or cools, based on the location 34. The climate control system 20 identifies the smartphone 32 (using a unique identifier 36, such as a cellular telephone number 38), retrieves a profile 40 associated with the smartphone 32, and heats or cools to preferred settings 44 defined by the profile 40. Suppose a user of the smartphone 32 stores her preferred temperature value 46 and/or humidity value 48 in the profile 40. When the location 34 associated with the smartphone 32 approximately matches the location associated with the room 22, the climate control system 20 may heat or cool to the user's preferred temperature value 46 and humidity value 48.

Any locational scheme may be used. The reader is probably familiar with global positioning system ("GPS") information 42, which is collected or determined by many mobile devices and smartphones. However, there are many other techniques for determining or estimating the location 34, especially for an indoor positioning system. For example, many techniques are known to determine the location 34 based on electromagnetic signals sent to, and/or or received from, the smartphone 32. While exemplary embodiments may utilize any locational scheme, the GPS information 42 will be primarily discussed and illustrated.

Figure 2:
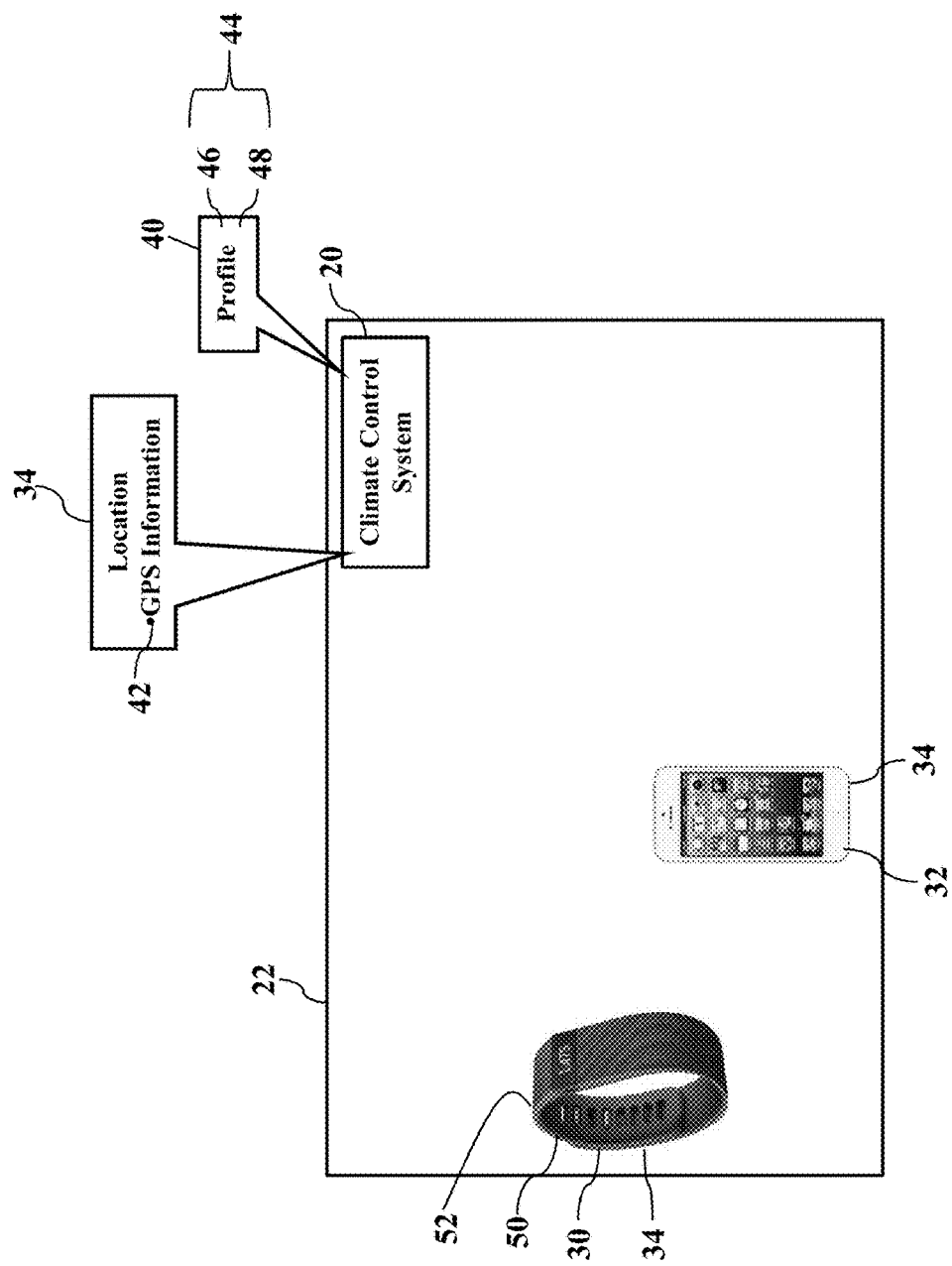

FIG. 2 further illustrates mobility. Here the mobile device 30 is illustrated as a smart band 50, such as a fitness monitor or a watch. The smart band 50, though, includes a skin sensor 52. The skin sensor 52 may measure or monitor a temperature and/or a conductivity (sweat) associated with the user's skin. The skin sensor 52 generates an output signal which may be interpreted to indicate the user's activity (such as sleeping or exercising). The climate control system 20 identifies the skin sensor 52 and obtains the output signal, or its interpretation, to heat or cool to the profile 40. Moreover, the climate control system 20 may also obtain the location 34 associated with the smart band 50. For example, the smart band 50 may self-report its current GPS information 42 using an integrated GPS transmitter (not shown for simplicity). However, the smart band 50 may interface with the user's smartphone 32 (which reports its GPS information 42). Regardless, as the smartphone 32 moves into the room 22, the climate control system 20 follows the location 34 and heats or cools to the profile 40.

Figure 3:
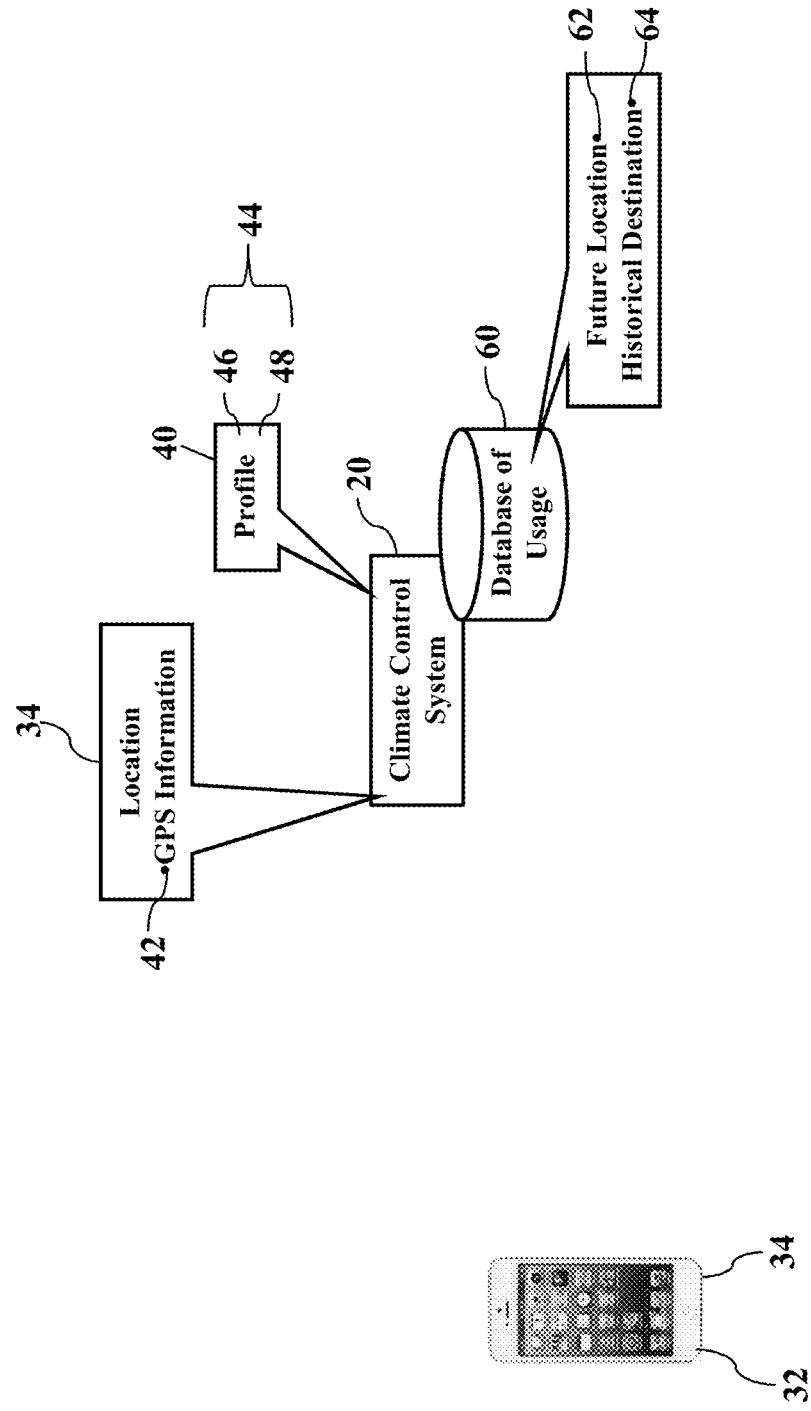

FIG. 3 illustrates locational anticipation. Here the climate control system 20 may predict where heating or cooling is needed, based on the location 34. The climate control system 20 obtains the location 34 associated with the mobile device 30, such as the smartphone 32 (as earlier explained). The climate control system 20 may then query a database 60 of usage. The database 60 of usage tracks the historical movements and usage of the smartphone 32 (which later paragraphs will explain in greater detail). In simple words, the database 60 of usage may store long-term records of the movements and usage of the smartphone 32. The climate control system 20 may query the database 60 of usage for the location 34 (such as the GPS information 42) and retrieve historical usage associated with that same location 34. For example, the climate control system 20 may predict or infer a future location 62. If the smartphone's recent locational reports match one or more historical entries, then the climate control system 20 may infer that the smartphone 32 is moving along a path historically observed. The climate control system 20 may thus predict the future location 62 based on a familiar route to a historical destination 64 previously logged in the database 60 of usage. The climate control system 20 may thus begin conditioning the future location 62 in anticipation of the user's arrival.

Figure 4:
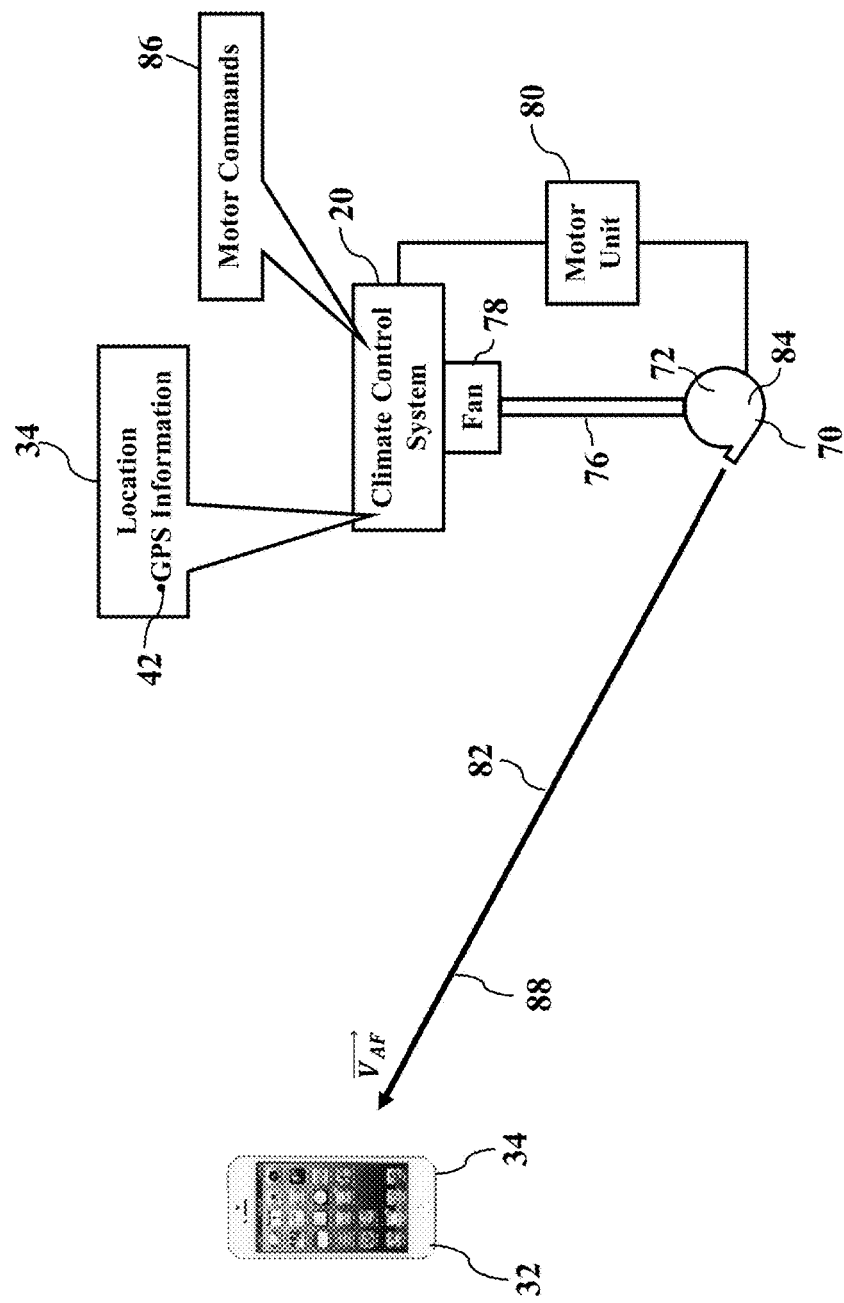
Figure 5:
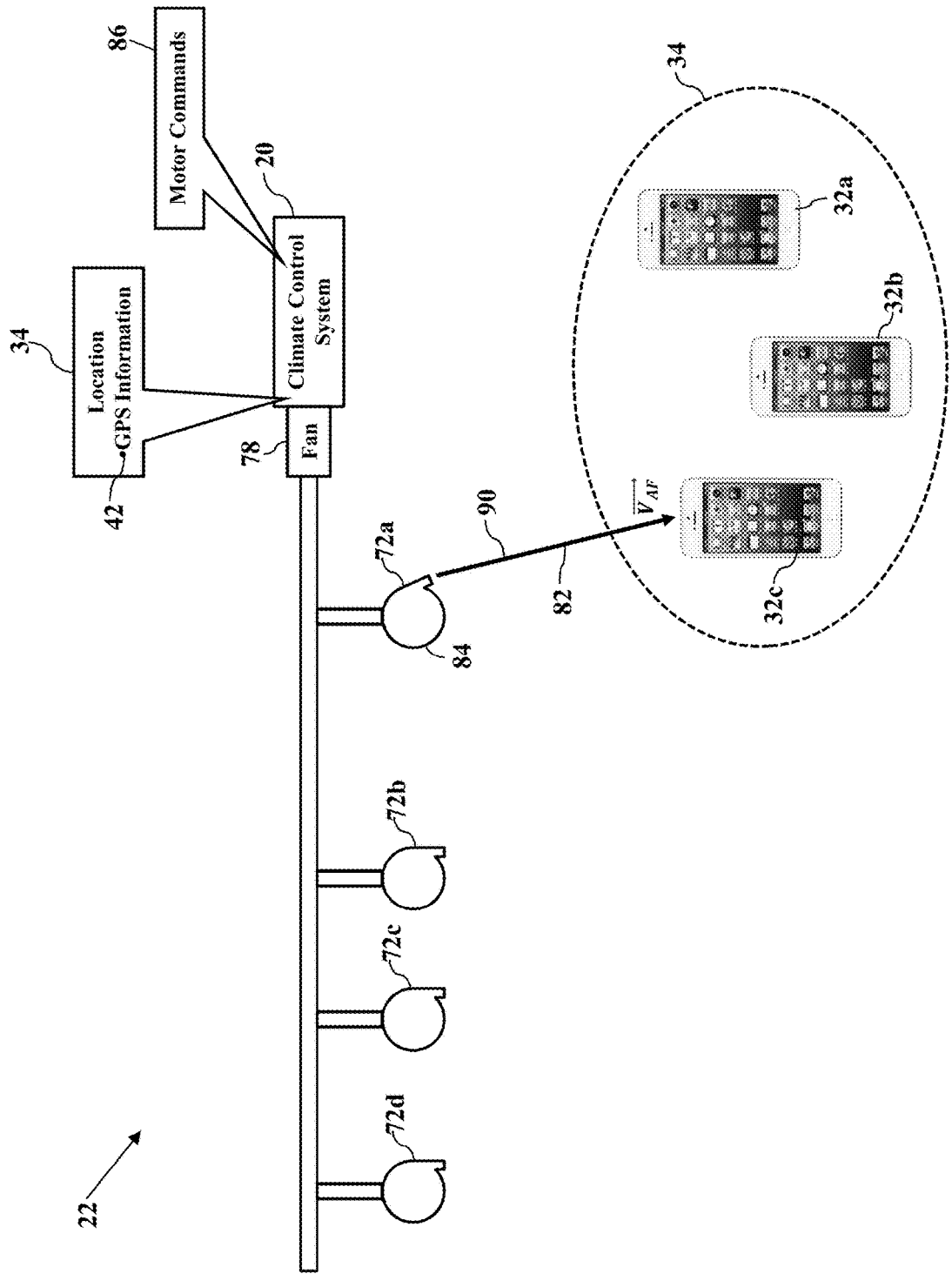

FIGS. 4-5 illustrate directional airflow. Exemplary embodiments may aim a stream 70 of air from the climate control system 20 to the user, based on the location 34 associated with her mobile device 30. FIG. 4, for example, illustrates an air terminal 72 that supplies conditioned air 74 from the climate control system 20. The air terminal 72 is thus an outlet for the conditioned air 74 fed by ductwork 76 from a fan 78, which is well known and need not be discussed in detail. Here, though, exemplary embodiments may include a motor unit 80 for changing a direction of a stream 70 of the conditioned air 74 from the air terminal 72. The air terminal 72, in other words, may have movable louvers, vents, diffusers, and/or nozzles. When the climate control system 20 obtains the location 34 associated with the smartphone 32, the climate control system 20 may then aim the air terminal 72 to that same location 34. Exemplary embodiments may determine an air flow vector $\vec{V}_{AF}$ (illustrated as reference numeral 82) to the location 34 associated with the smartphone 32. FIG. 4, for example, illustrates the air flow vector $\vec{V}_{AF}$ 82 having a beginning or origination at a terminal location 84 associated with the air terminal 72. The airflow vector $\vec{V}_{AF}$ 82 may terminate or end at the location 34 associated with the smartphone 32. Exemplary embodiments may then generate motor commands 86 that instruct the motor unit 80 to aim or align to the air flow vector $\vec{V}_{AF}$ 82. The air terminal 72 thus flows the stream 70 of the conditioned air 74 in a vector direction 88 to the smartphone 32, thus providing effective and perhaps immediate relief to the user's profile 40.

FIG. 5 illustrates group conditioning. Here exemplary embodiments may aim the air terminal 72 to comfort multiple users. As the reader may understand, there may be several people in the room 22, with each person carrying their own smartphone 32. Exemplary embodiments may thus retrieve multiple current locations 34, with each different location 34 corresponding to a different one of the smartphone 32. If the room 22 is served by multiple air terminals (illustrated, respectively, as 72a-72d), the climate control system 20 may thus dedicate a single air terminal 72a to serve one or more of the users, perhaps based on a common or nearly matching location 34. FIG. 5 thus illustrates a huddle of different smartphones (illustrated, respectively, as 32a-32c), thus having a similar location 34. The climate control system 20 may select one of the air terminals 32a, perhaps having a shortest vector length (e.g., magnitude or $|\vec{V}_{AF}|$) 90 for the air flow vector $\vec{V}_{AF}$ (illustrated as reference numeral 82) to the similar location 34. Other air terminals (e.g., 72b-72d) may be dedicated to other users, based on their respective vector lengths 90 to other smartphones.

Figure 6:
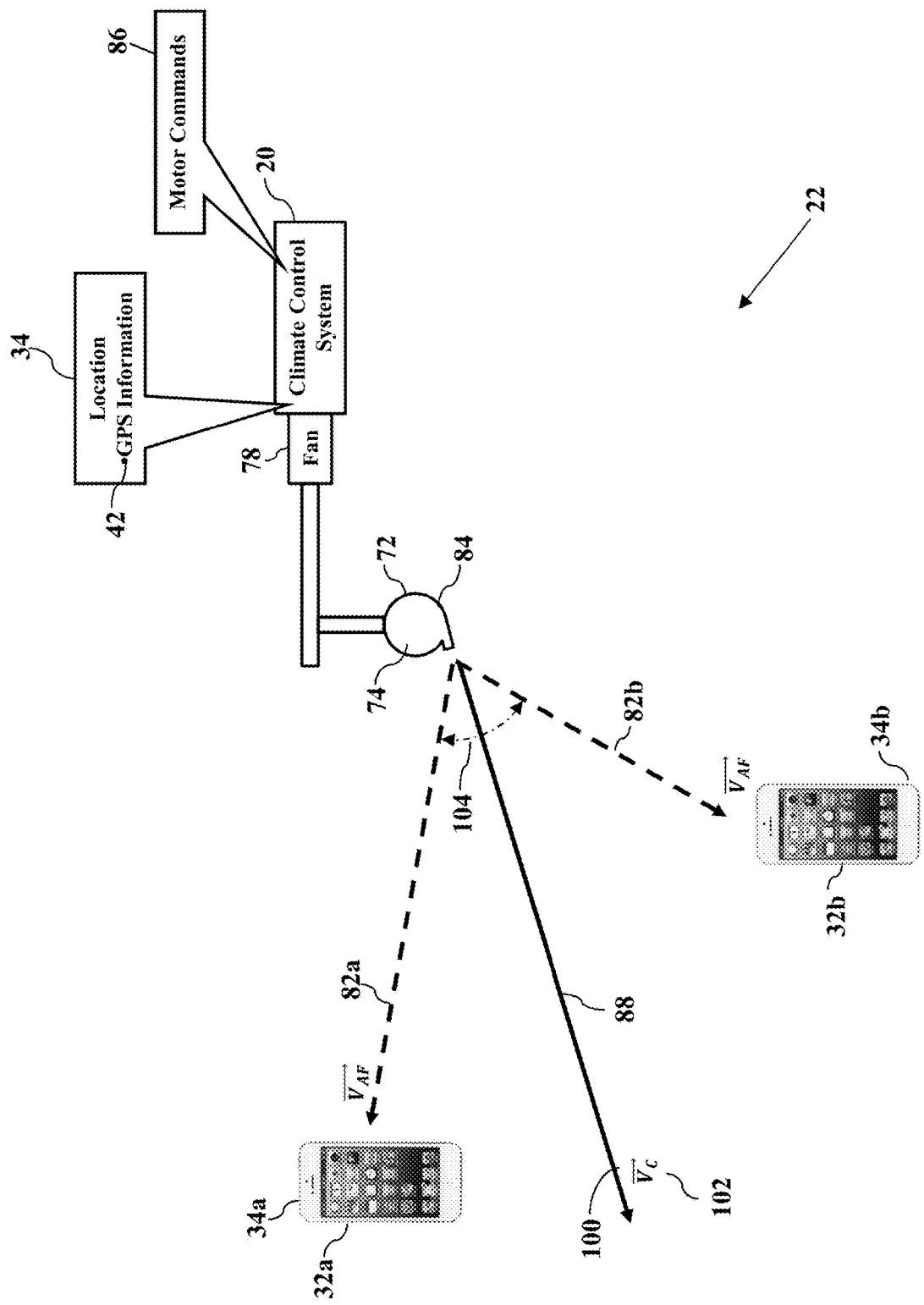

FIG. 6 illustrates an environmental compromise 100. Here exemplary embodiments may determine a compromise airflow vector $\vec{V}_C$ (illustrated as reference numeral 102) based on different locations 34 associated with different smartphones 32. Suppose, for example, the room 22 is served by the single air terminal 72. If multiple users are located in the room 22, exemplary embodiments may determine the compromise airflow vector $\vec{V}_C$ 102 that best serves the multiple occupants, based on the locations 34 of the smartphones 32. FIG. 6, for simplicity, illustrates two (2) smartphones 32a and 32b. Each smartphone 32a and 32-b has a corresponding location 34a and 34b. The climate control system 20 may determine a first air flow vector $\vec{V}_{AF}$ (illustrated as reference numeral 82a) associated with the first smartphone 32a. The climate control system 20 may determine a second air flow vector $\vec{V}_{AF}$ (illustrated as reference numeral 82*b*) associated with the second smartphone 32*b*. Exemplary embodiments may then determine the compromise airflow vector $\vec{V}_C$ 102 that bisects air flow vectors $\vec{V}_{AF}$ 82*a* and $\vec{V}_{AF}$ 82*b*.

Exemplary embodiments may then output to the compromise airflow vector $\vec{V}_C$ 102. As two different users share the room 22, the compromise airflow vector $\vec{V}_C$ 102 may represent the environmental compromise 100 between the two different locations 34*a* and 34*b*. Exemplary embodiments may aim the conditioned air 74 to the vector direction 88 associated with the compromise airflow vector $\vec{V}_C$ 102. Each different user, in other words, may get an equal share of the directional airflow output by the air terminal 72. Exemplary embodiments may then generate or retrieve the motor commands 86 that instruct the motor unit (illustrated as reference numeral 80 in FIG. 4) to aim or align to the compromise airflow vector $\vec{V}_C$ 102. The air terminal 72 thus flows the conditioned air 74 in the vector direction 88 that bisects an angle 104 between each user's location 34*a* and 34*b* (as determined by their respective smartphones 32*a* and 34*b*).

Figure 7:
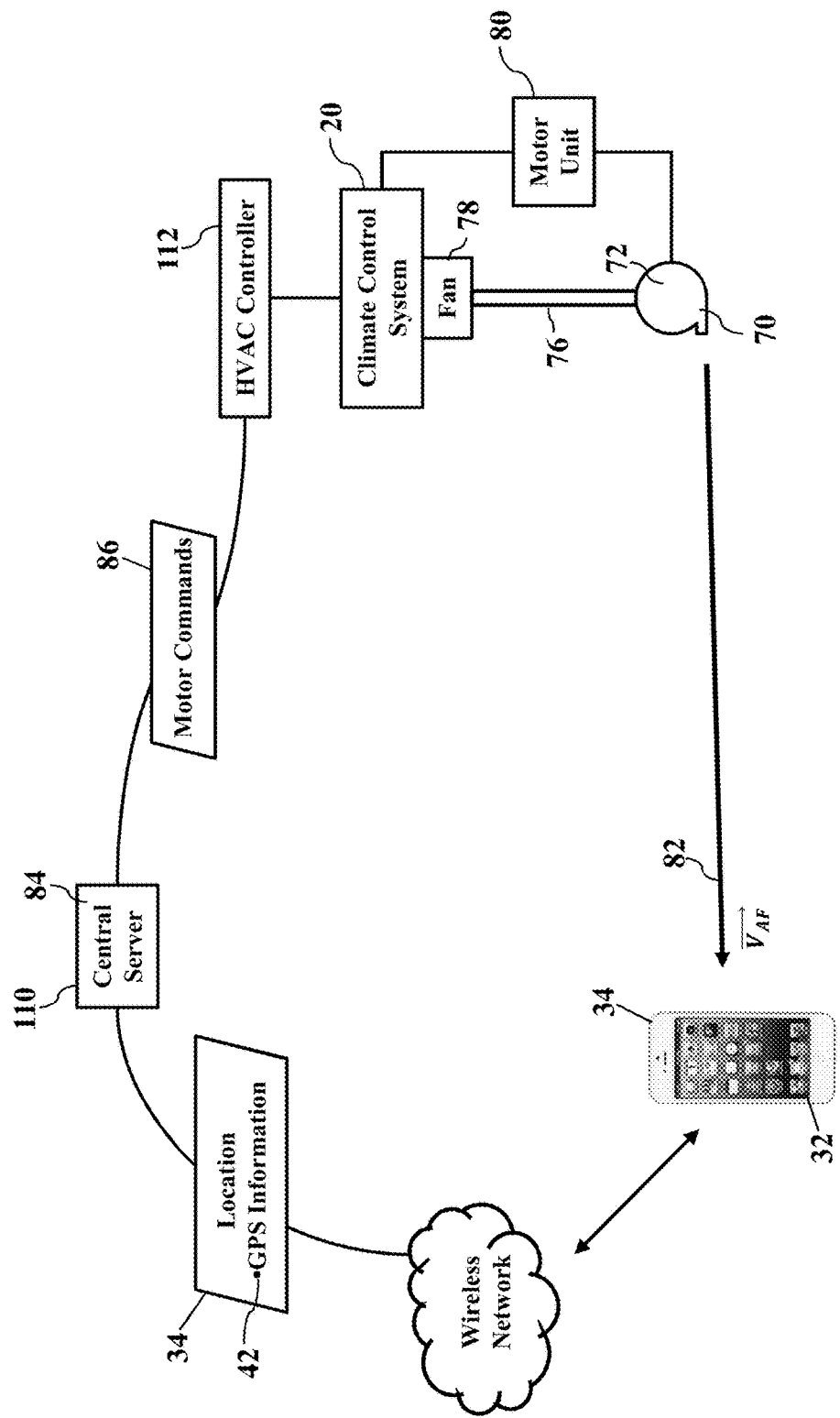

FIG. 7 illustrates network analysis. Here a central server 110 may provide a web-based climate control analysis based on the location 34 associated with the occupant's smartphone 32. Again, because the global positioning system is perhaps familiar to most readers, the central server 110 may obtain the GPS information 42 wirelessly reported by the smartphone 32. However, any locational scheme may be used. Once the location 34 is determined, the central server 110 may also retrieve the terminal location 84 associated with the air terminal 72. The central server 110 determines the air flow vector $\vec{V}_{AF}$ (illustrated as reference numeral 82) and generates the motor commands 86. Here, though, the central server 110 may then send or route the motor commands 86 to a network address associated with the climate control system 20. FIG. 7, for example, illustrates an HVAC controller 112 that controls the components of the climate control system 20. The HVAC controller 112 receives and executes the motor commands 86 to aim the air terminal 72 to the occupant's smartphone 32. The central server 110 may thus provide a cloud or Internet-based service to multiple HVAC systems. Residential and business climate control systems are thus relieved of the perhaps burdensome processing and calculations that are required to follow the movements of the mobile devices 30. Moreover, the central server 110 provides a simple retrofit option for existing systems, which can be years or even decades old. A new climate control system may cost thousands of dollars, which is cost prohibitive, especially when still reliable. Exemplary embodiments, though, merely require retrofit of the motorized air terminal 72 and network interfacing, which is a relatively small cost.

Exemplary embodiments thus adapt to the mobile environment. As occupants move about the room 22, the climate control system 20 may track each occupant's location 34, based on their mobile devices 30. The climate control system 20 may then direct airflow to any location 34, thus providing immediate heating or cooling relief. Moreover, the climate control system 20 may retrieve the profile 40 and further heat or cool to any user's preferred settings 44. If multiple mobile devices 30 are detected, the climate control system 20 may determine the environmental compromise 100 between different occupants.

Figure 8:
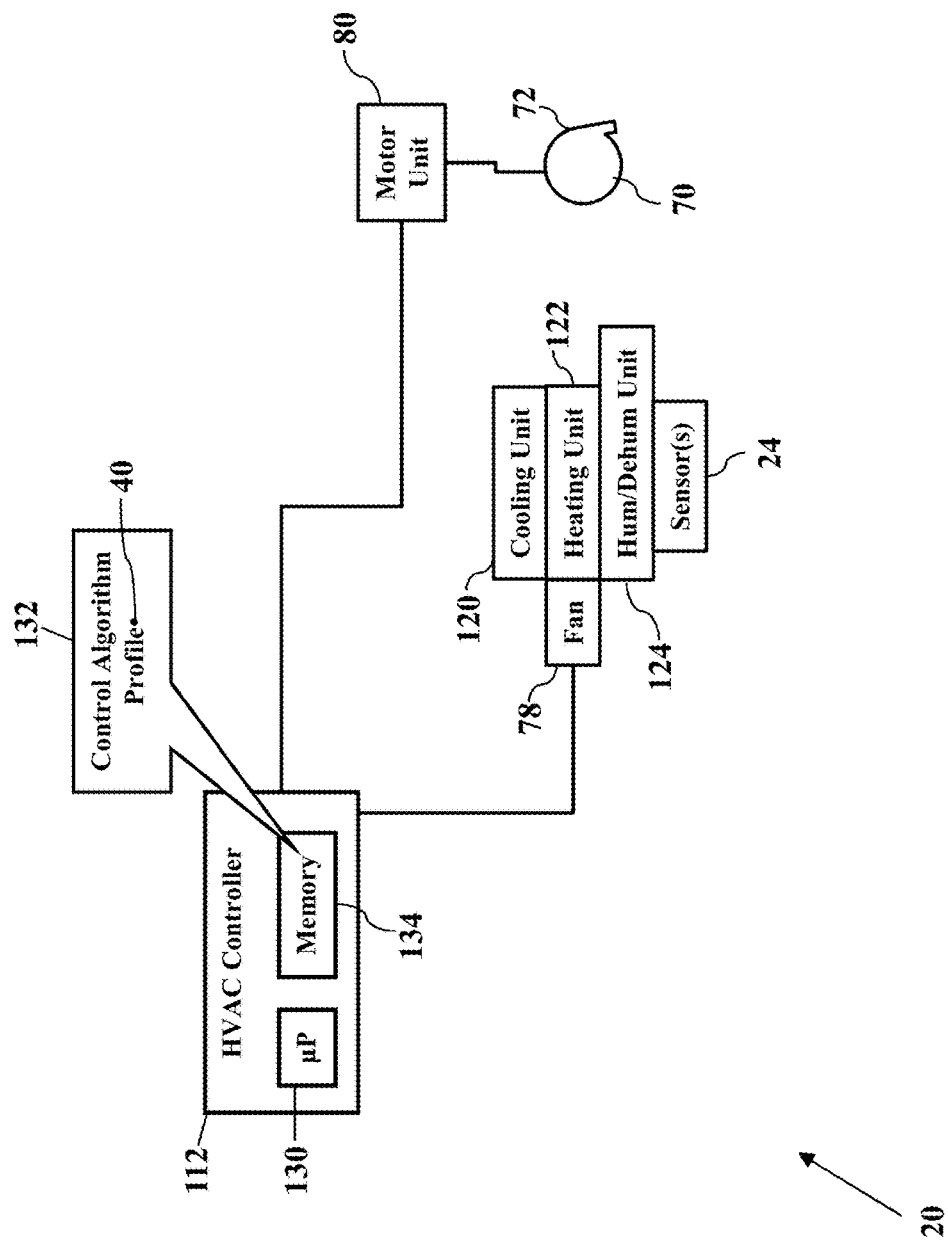
FIGS. 8-11 are more detailed illustrations of the operating environment, according to exemplary embodiments.

FIGS. 8-11 are more detailed illustrations of the operating environment, according to exemplary embodiments. FIG. 8 illustrates the basic operating components of the climate control system 20. Climate control systems are generally well known, so no detailed explanation is needed. FIG. 8, for simplicity, illustrates the HVAC controller 112 interfacing with a cooling unit 120, a heating unit 122, a humidifier/dehumidifier ("Hum/DeHum") unit 124, the fan 78, and the air terminal 72. The HVAC controller 112 has a processor 130 (e.g., "μP"), application specific integrated circuit (ASIC), or other component that executes a control algorithm 132 stored in a memory 134. The control algorithm 132 instructs the processor 130 to perform operations, such as retrieving any sensory data associated with the environmental sensor(s) 24. The control algorithm 132, for example, may instruct the processor 130 to retrieve a temperature and/or conductivity (sweat) associated with the user's skin (as measured by the skin sensor 52 in the smart band 50, as illustrated with reference to FIG. 2). However, exemplary embodiments may obtain the sensory data from any environmental sensors, such as the temperature sensor 26 and humidity sensor 28 (illustrated in FIG. 1). The control algorithm 132 may also instruct the processor 130 to retrieve the profile 40 associated with the occupant's smartphone 32. The control algorithm 132 obtains the occupant's preferred settings 44 from the profile 40 and compares to the actual environmental measurements obtained from the sensor(s) 24. The control algorithm 132 may then instruct the processor 130 to condition the environment, such as activating the cooling unit 120 to reduce the temperature or activating the heating unit 122 to increase the temperature.

Figure 9:
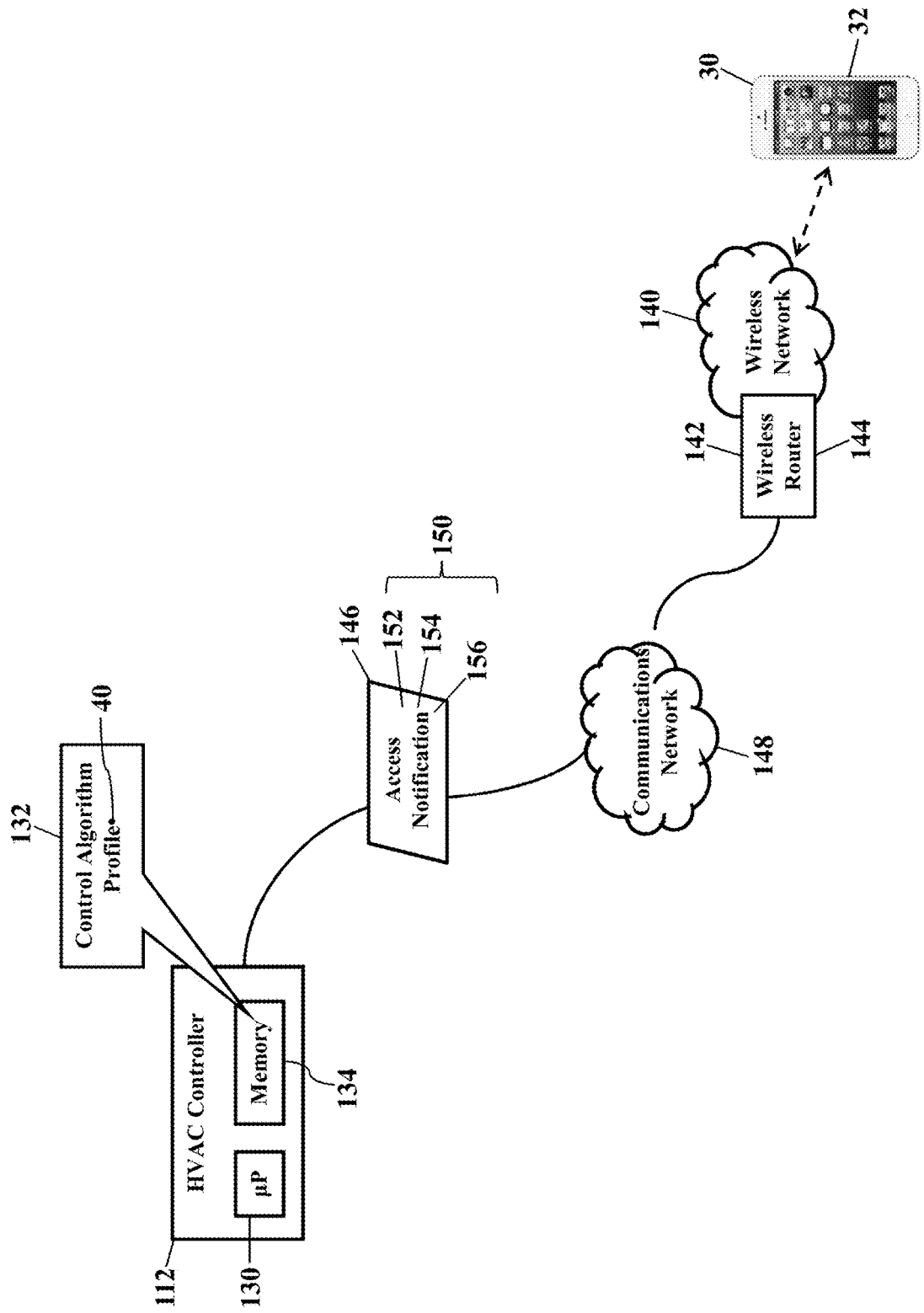

FIG. 9 illustrates profile determination. The control algorithm 132 may be notified of the smartphone 32, and/or the HVAC controller 112 may communicate with the smartphone 32. FIG. 9, for example, illustrates network access. Here the HVAC controller 112 may be notified of the presence detection of the smartphone 32. When the smartphone 32 enters any area, the smartphone 32 may establish wireless communication with a wireless network 140 serving the area. The smartphone 32, for example, may request access or permission to a wireless local area network (such as WI-FI®), wide area cellular network, or any other network. The smartphone 32 may thus instruct its transceiver (not shown for simplicity) to wirelessly request access permission using the electromagnetic frequency band required by the wireless network 140. When the wireless network 140 detects the smartphone 32, exemplary embodiments may inform the HVAC controller 112. As FIG. 9 illustrates, the smartphone 32 may send an access request to an access device 142 serving the wireless network 140. FIG. 9 illustrates the access device 142 as a wireless router 144, which commonly serves many residential and business WIFI® networks. However, the access device 142 may be any network interface to an access network, such as a gateway, cable modem, or DSL modem. Regardless, the smartphone 32 broadcasts a request that seeks access permission to the wireless network 140. When the access device 142 receives the access request, the access device 142 may send a packetized access notification 146 into a communications network 148 for routing and delivery to a network address associated with the HVAC controller 112. The access notification 146 may thus alert the HVAC controller 112 to the radio frequency presence of the occupant's smartphone 32. The access notification 146 may further include information that uniquely identifies the smartphone 32, such as data representing a cellular identifier 150. While any alphanumeric combination may uniquely identify the smartphone 32, FIG. 9 illustrates the smartphone's cellular telephone number (or "CTN") 152, International Mobile Subscriber Identity (or "IMSI") 154, or Mobile Station International Subscriber Directory Number ("MSISDN") 156. Whenever the mobile smartphone 32 sends messages or information, the smartphone 32 may include or self-report the CTN 152, IMSI 154, and/or MSISDN 156.

Exemplary embodiments may packetize. As any component of the climate control system 20 may communicate with the communications network 148, any component (e.g., the HVAC controller 112, the cooling unit 120, the heating unit 122, the humidifier/dehumidifier unit 124, the fan 78, and/or the air terminal 72) may have a network interface. The network interface to the communications network 148 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
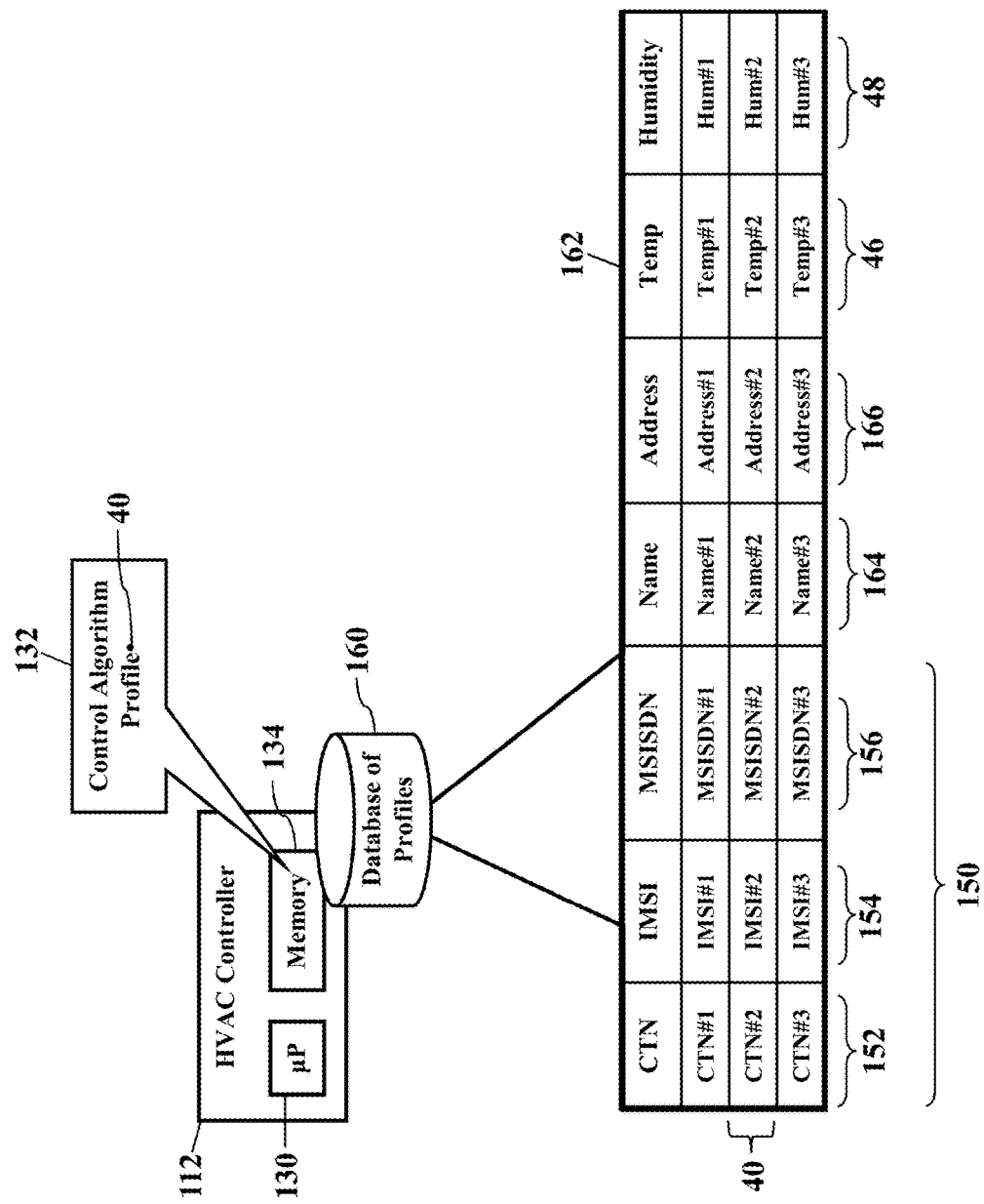

FIG. 10 illustrates profile determination. When the HVAC controller 112 receives the cellular identifier 150, the HVAC controller 112 may retrieve the corresponding profile 40. For example, the HVAC controller 112 may query an electronic database 160 of profiles for a matching entry. FIG. 10 thus illustrates the database 160 of profiles as a table 162 having electronic database associations between different profiles 40 and different cellular identifiers 150. The HVAC controller 112 may thus query for a profile entry that matches the CTN 152, the IMSI 154, and/or the MSISDN 156 detailed in the access notification 146 (illustrated in FIG. 9). If the database 160 of profiles contains a matching entry, then the HVAC controller 112 retrieves the corresponding profile 40 and its preferred settings 44 (such as the temperature 46 and the humidity 48). However, the profile 40 may include any other information, such as an identifying name 164 and address 166. While FIG. 10 only illustrates a few different profiles 40, in actual practice the electronic database 160 of profiles may stores hundreds or even thousands of entries for hundreds or thousands of different mobile devices. Moreover, while the database 160 of profiles is illustrated as locally stored in the memory 134 of the HVAC controller 112, the database 160 of profiles may be remotely stored and accessed via the communications network 148 (also illustrated in FIG. 9).

Figure 11:
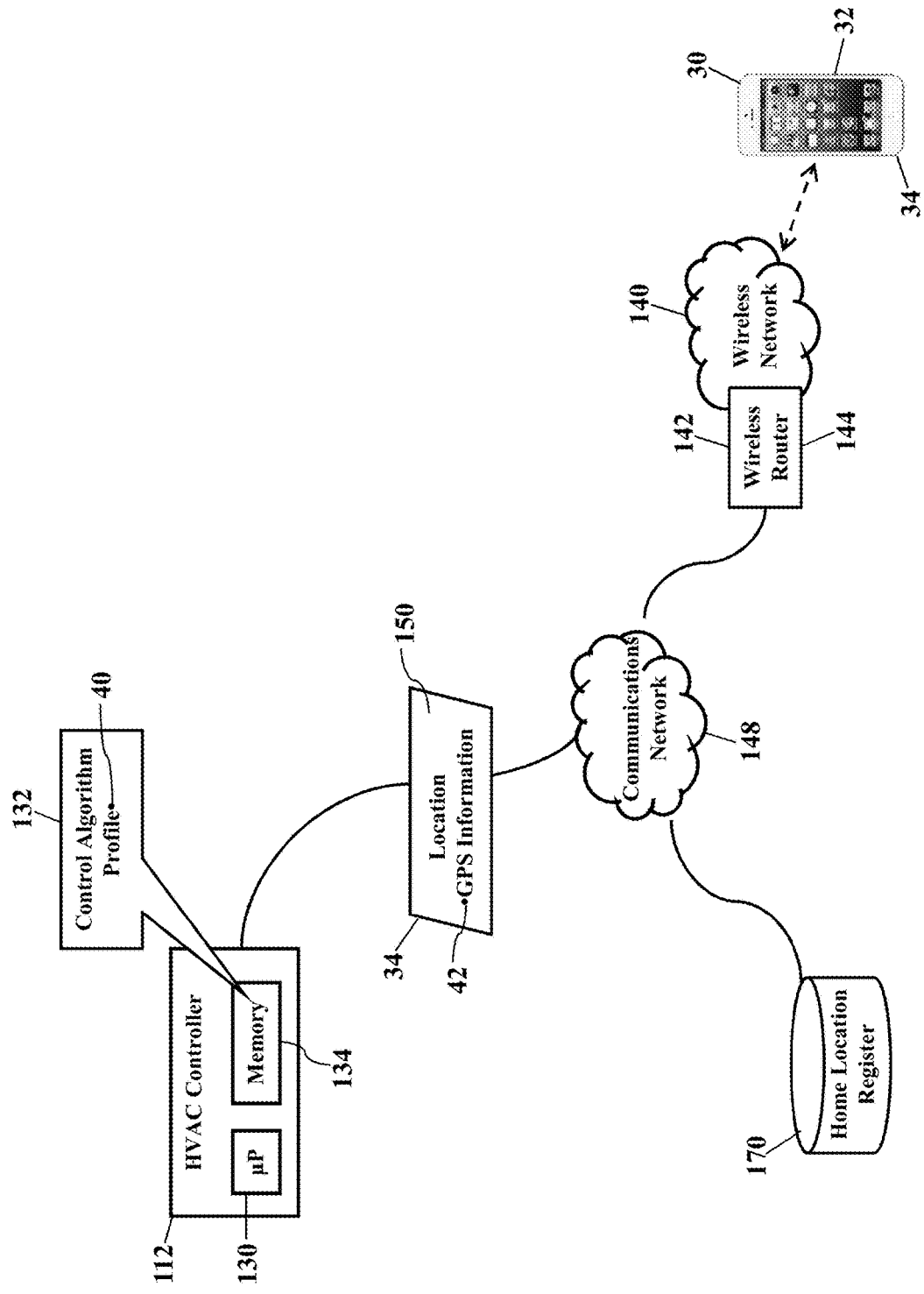

FIG. 11 illustrates locational determination. Here exemplary embodiments determine the location 34 associated with the smartphone 32. For example, once the smartphone 32 joins the wireless network 140, the smartphone 32 may randomly or periodically report its global positioning system ("GPS") information 42 (along with its cellular identifier 150). The HVAC controller 112 may optionally query the smartphone 32 for its GPS information 42. The HVAC controller 112 may also query a home location register 170 or other cellular network component for the current location 34 associated with the cellular identifier 150 (e.g., CTN 152, IMSI 154, and/or MSISDN 156). Again, because the global positioning system is perhaps familiar to most readers, this disclosure primarily explains the GPS information 42. However, exemplary embodiments may utilize any indoor or outdoor locational scheme known or determined in the future. As locational positioning is generally known, no detailed explanation is needed.

Figure 12:
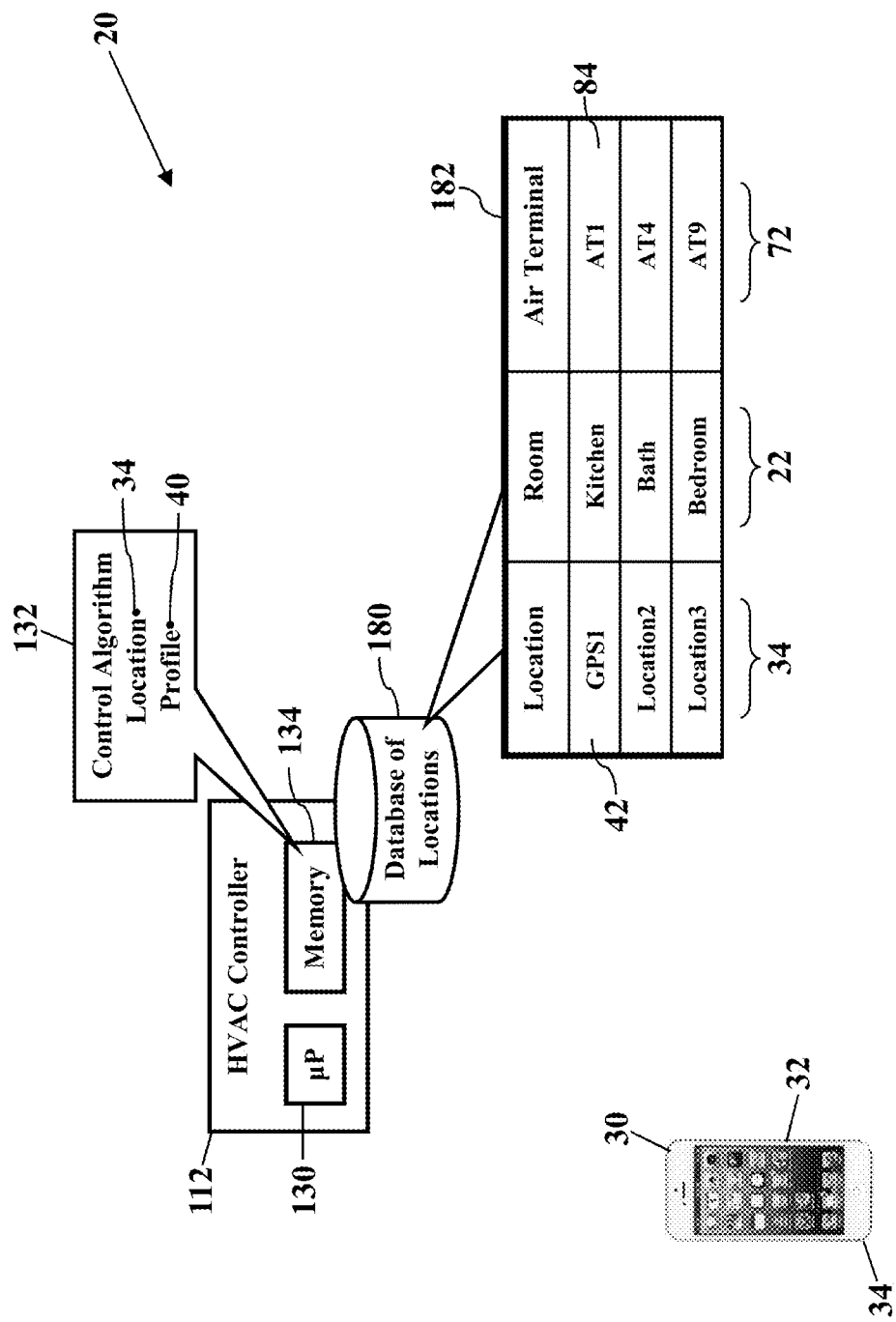
FIGS. 12-13 illustrate locational conditioning, according to exemplary embodiments.
Figure 13:
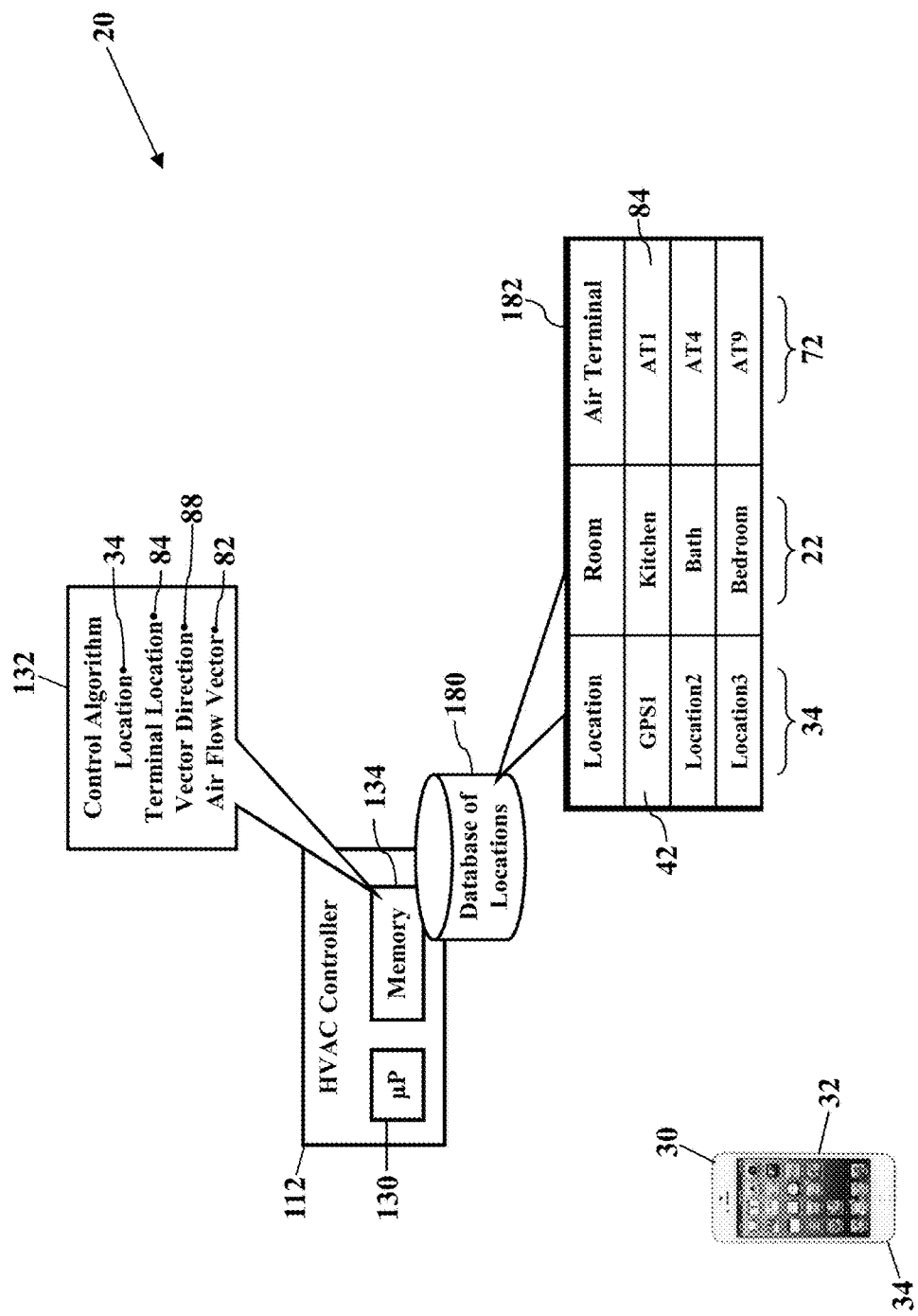

FIGS. 12-13 illustrate locational conditioning, according to exemplary embodiments. Here exemplary embodiments may condition rooms or other areas based on the location 34 associated with the smartphone 32. Once the location 34 (associated with the smartphone 32) is known, the HVAC controller 112 may then determine which room or area should be conditioned to the profile 40. FIG. 12, for example, illustrates an electronic database 180 of locations. The electronic database 180 of locations stores entries representing the different rooms or areas served by the climate control system 20. The HVAC controller 112 may thus query the electronic database 180 of locations for the location 34 and retrieve the matching entry. FIG. 12 thus illustrates the database 180 of locations as a table 182 that electronically maps, relates, or associates different locations 34 to rooms 22 and to different air terminals 72. That is, the electronic database 180 of locations may store different terminal locations 84 associated with any of the air terminals 72 outputting conditioned air generated by the climate control system 20. Each terminal location 84, for simplicity, may thus be represented with GPS coordinates. So, once the location 34 (associated with the smartphone 32) is known, the HVAC controller 112 may query the electronic database 180 of locations and retrieve the matching terminal location 84 associated with the air terminal 72. Exemplary embodiments may thus determine the air terminal 72 that serves the location 34 (such as the GPS information 42) associated with the smartphone 32. The database 180 of locations is illustrated as being locally stored in the memory 134 of the HVAC controller 112, but some or all of the database entries may be remotely maintained at some other server or location in the communications network (illustrated as reference numeral 148 in FIGS. 9 & 11). While FIG. 12 only illustrates a few entries, in practice the database 180 of locations may contain many entries for hundreds or thousands of air terminals, especially in a central network-accessible database.

FIG. 13 illustrates the directional airflow. Once the location 34 associated with the smartphone 32 is known, and once the terminal location 84 associated with the air terminal 72 is known (perhaps using the database 180 of locations), exemplary embodiments may thus determine the vector direction 88 of the airflow output from the air terminal 72. The HVAC controller 112 may thus determine the air flow vector $\vec{V}_{AF}$ (illustrated as reference numeral 82) from the terminal location 84 (associated with the air terminal 72) to the location 34 associated with the smartphone 32. For example, coordinate subtraction may be used to determine vector geometries.

Figure 14:
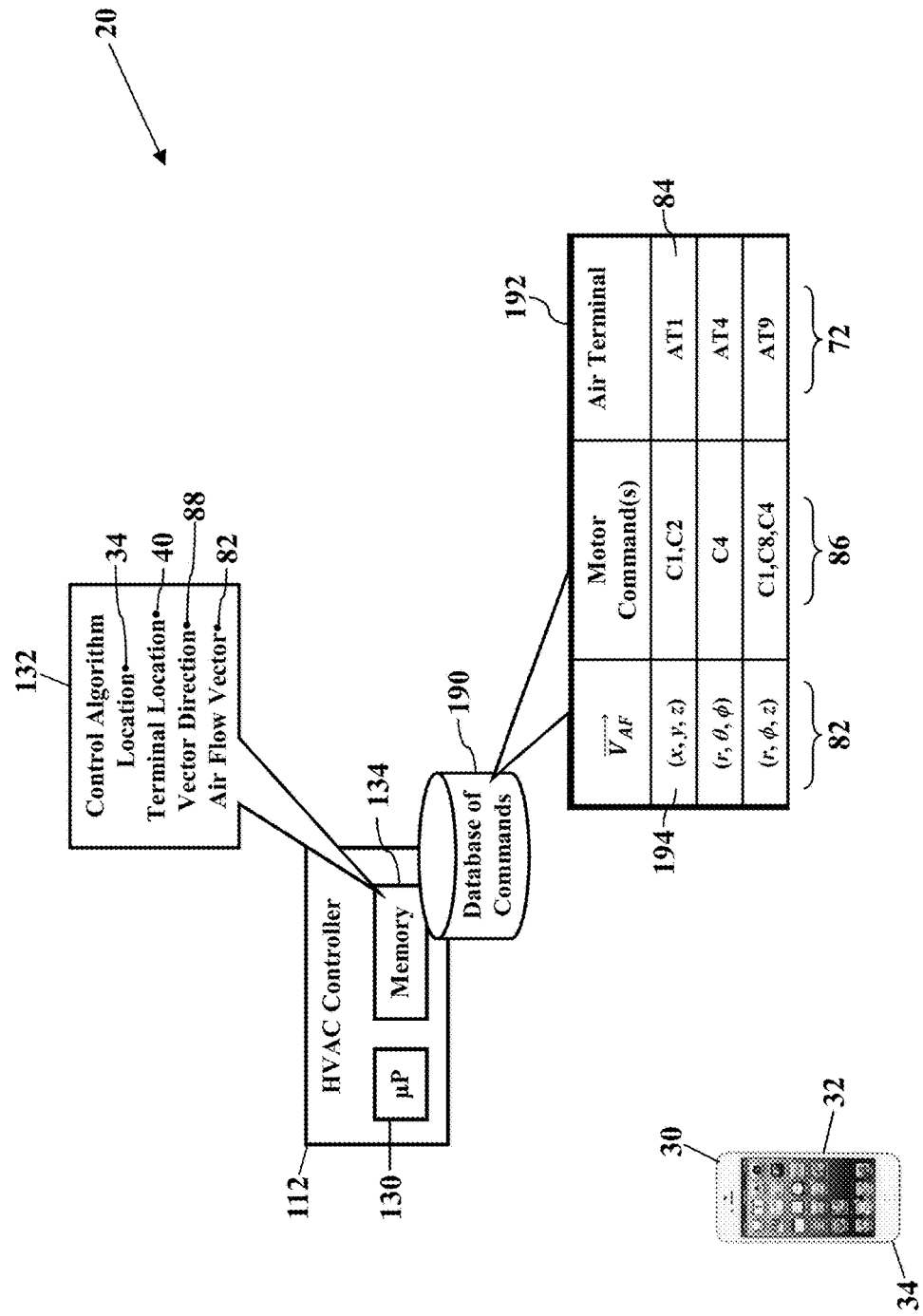
FIG. 14 illustrates motor commands, according to exemplary embodiments.

FIG. 14 illustrates the motor commands 86, according to exemplary embodiments. Now that the air flow vector $\vec{V}_{AF}$ 82 to the smartphone 32 is determined, the HVAC controller 112 may determine the motor commands 86 that aim the air terminal 72 to the location 34 of the smartphone 32. While any technique may be used to convert the air flow vector $\vec{V}_{AF}$ 82 into the motor commands 86, FIG. 14 illustrates an elegant database lookup. The HVAC controller 112 may query an electronic database 190 of commands for the air flow vector $\vec{V}_{AF}$ 82 and retrieve the matching entry. FIG. 14 thus illustrates the database 190 of commands as a table 192 that electronically maps, relates, or associates different air flow vectors 82 to different motor commands 86. That is, the electronic database 190 of commands may be configured to store predetermined air flow vectors 82 and their corresponding motor commands 86. Exemplary embodiments may thus map coordinate values or coefficients 194 to the motor commands 86. While an almost infinite number of air flow vectors $\vec{V}_{AF}$ 82 may be possible, in practice perhaps only several air flow vectors 82 are adequate for most situations. That is, most locations may be resolved to perhaps a relatively small number of air flow vectors $\vec{V}_{AF}$ 82. Regardless, the HVAC controller 112 may query the electronic database 190 of commands and retrieve the matching motor commands 86 associated with the air flow vector $\vec{V}_{AF}$ 82. The database 190 of commands is illustrated as being locally stored in the memory 134 of the HVAC controller 112, but some or all of the database entries may be remotely maintained at some other server or location in the communications network (illustrated as reference numeral 148 in FIGS. 9 & 11). The HVAC controller 112 may then execute the motor commands 86 to aim the corresponding air terminal 72 to the location 34 of the smartphone 32.

Figure 15:
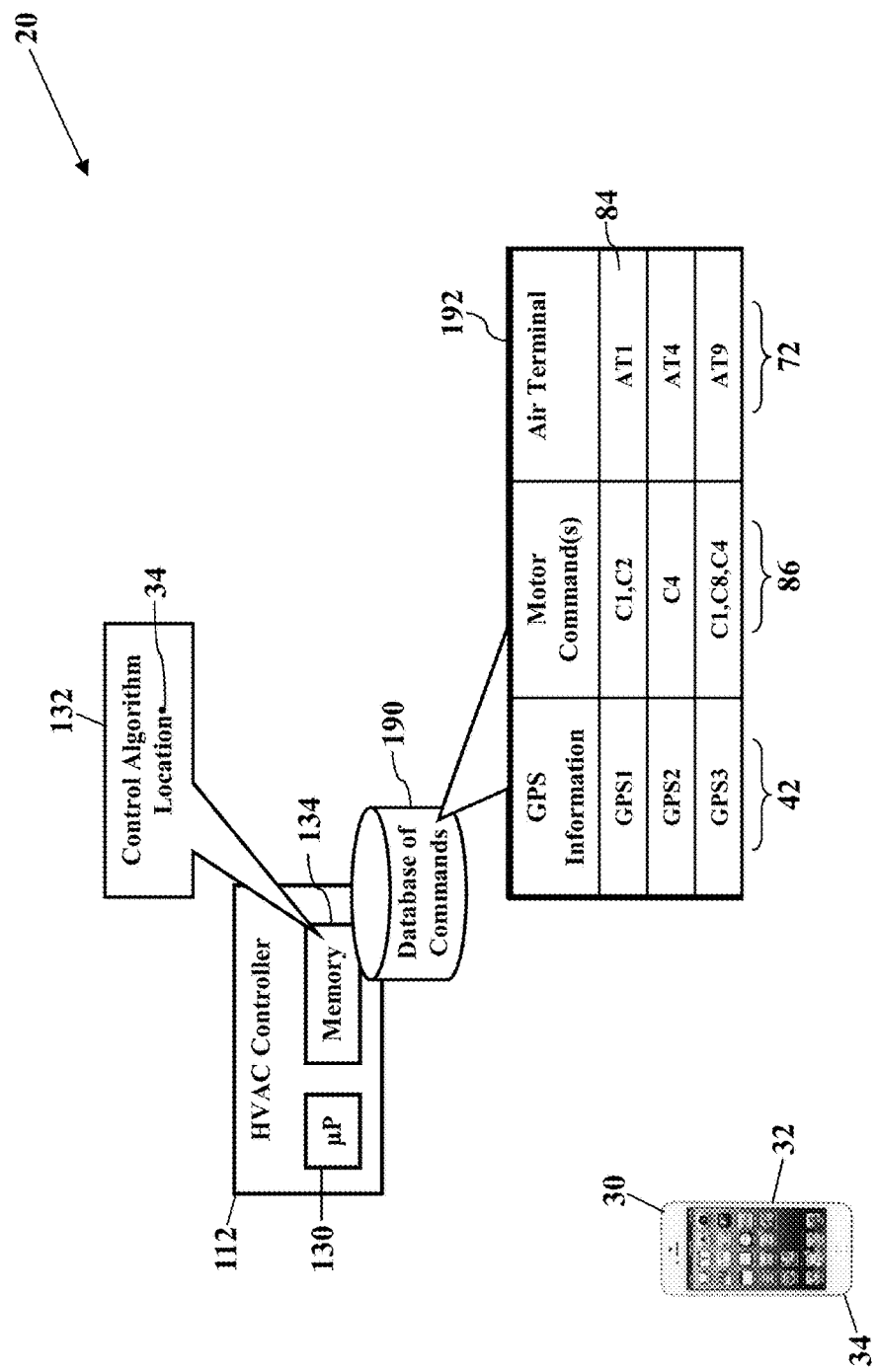
FIG. 15 further illustrates locational conditioning, according to exemplary embodiments.

FIG. 15 further illustrates locational conditioning, according to exemplary embodiments. Here exemplary embodiments may be simplified in some aspects when determining the motor commands 86. Once the location 34 associated with the smartphone 32 is known, the HVAC controller 112 may query the electronic database 190 of commands for the location 34. The database 190 of commands may thus be prepopulated with the motor commands 86 that are predetermined according to the location 34 associated with the smartphone 32. Again, because the global positioning system is perhaps familiar to most readers, FIG. 15 illustrates the GPS information 42 (associated with the smartphone 32) may be mapped to their corresponding motor commands 86. However, exemplary embodiments may utilize any indoor or outdoor locational scheme known or determined in the future. The database 190 of commands may be configured to store different predetermined motor commands 86 for different locations 34 served by the air terminal 72. The HVAC controller 112 may simply query for the location 34 and retrieve and execute the corresponding motor commands 86. The HVAC controller 112 thus quickly aims the air terminal 72 to the location 34 of the smartphone 32.

Figure 16:
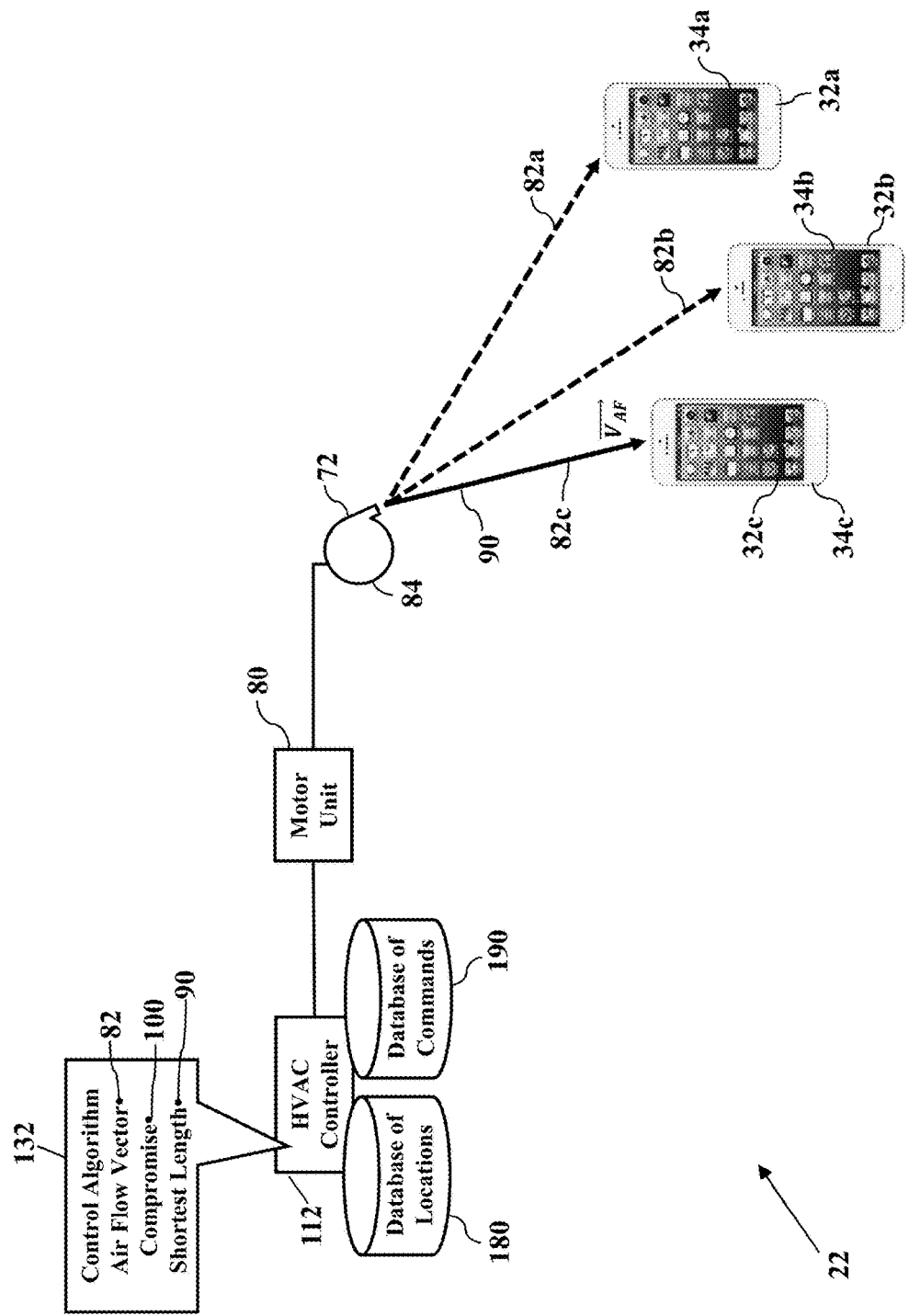
FIG. 16 illustrates group conditioning, according to exemplary embodiments.

FIG. 16 illustrates group conditioning, according to exemplary embodiments. Recall that several occupants may occupy the room served by the air terminal 72. If each occupant carries their own smartphone 32, the HVAC controller 112 may retrieve or obtain multiple locations 34. A simple solution would be to aim a different air terminal to each occupant's location 34, especially if there is a one-to-one relationship. A single air terminal 72, in other words, may be dedicated to a single one of the smartphones 32. In many situations, though, the number of occupants will outnumber the number of air terminals 72.

Exemplary embodiments may thus implement the environmental compromise 100. The air terminal 72 may be assigned to supply air to two (2) or more smartphones 32 (such as 32a, 32b, and 32c). For example, the HVAC controller 112 may compare all the different locations 34a, 34b, and 34c and determine each corresponding air flow vector $\vec{V}_{AF}$ (illustrated as reference numerals 82a, 82b, and 82c). The HVAC controller 112 may then compute each corresponding the magnitude or vector length 90a, 90b, and 90c and compare for the shortest. The HVAC controller 112 may then select the air flow vector $\vec{V}_{AF}$ (illustrated as reference numeral 82a) to the having the shortest vector length 90a. Exemplary embodiments, in other words, may select and aim the air terminal 72, based on the vector length 90 to any one or more of the smartphones 32.

Figure 17:
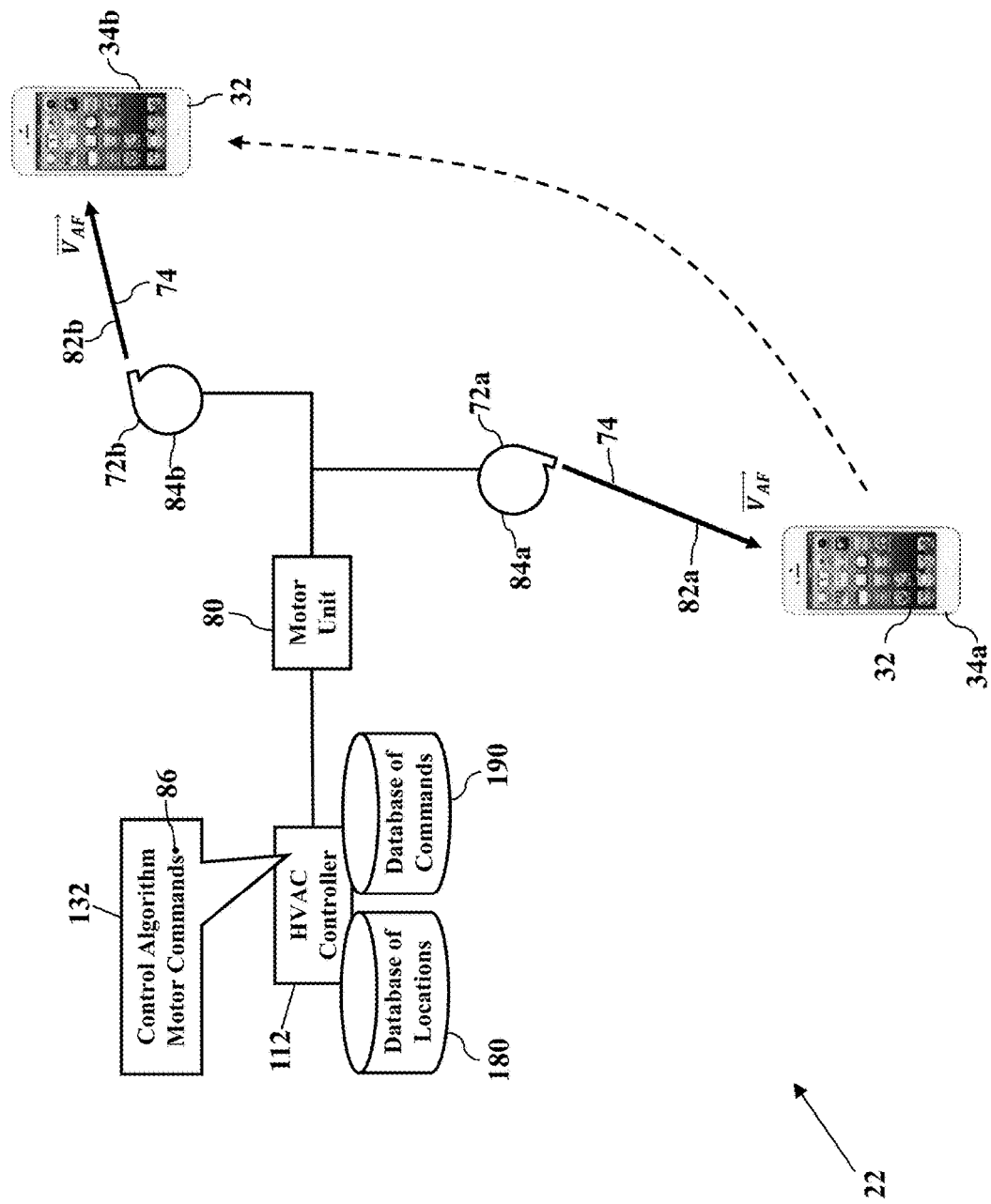
FIG. 17 illustrates terminal handoffs, according to exemplary embodiments.

FIG. 17 illustrates terminal handoffs, according to exemplary embodiments. As an occupant moves, the location 34 associated with her smartphone 32 changes. At some point the smartphone 32 may become too distant from the air terminal 72 for effective heating or cooling. Exemplary embodiments, then, may switch air terminal assignments based on the location 34 associated with the smartphone 32. FIG. 17, for example, illustrates the smartphone 32 moving from a first location 34a to a second location 34b. The HVAC controller 112 queries the database 180 of locations (as earlier explained) and retrieves a first air terminal 72a (mapping to the first location 34a). At some point, though, the smartphone 32 moves to the second location 34b, which maps to a different, second air terminal 72b. The HVAC controller 112 may thus retrieve the corresponding motor commands 86 (as earlier explained), thus switching output of the conditioned air 74. So, as the smartphone 32 moves throughout a room or building, exemplary embodiments may thus continually track the movement and output the conditioned air 74 to the location 34 that corresponds to the nearest or proximate air terminal 72.

Figure 18:
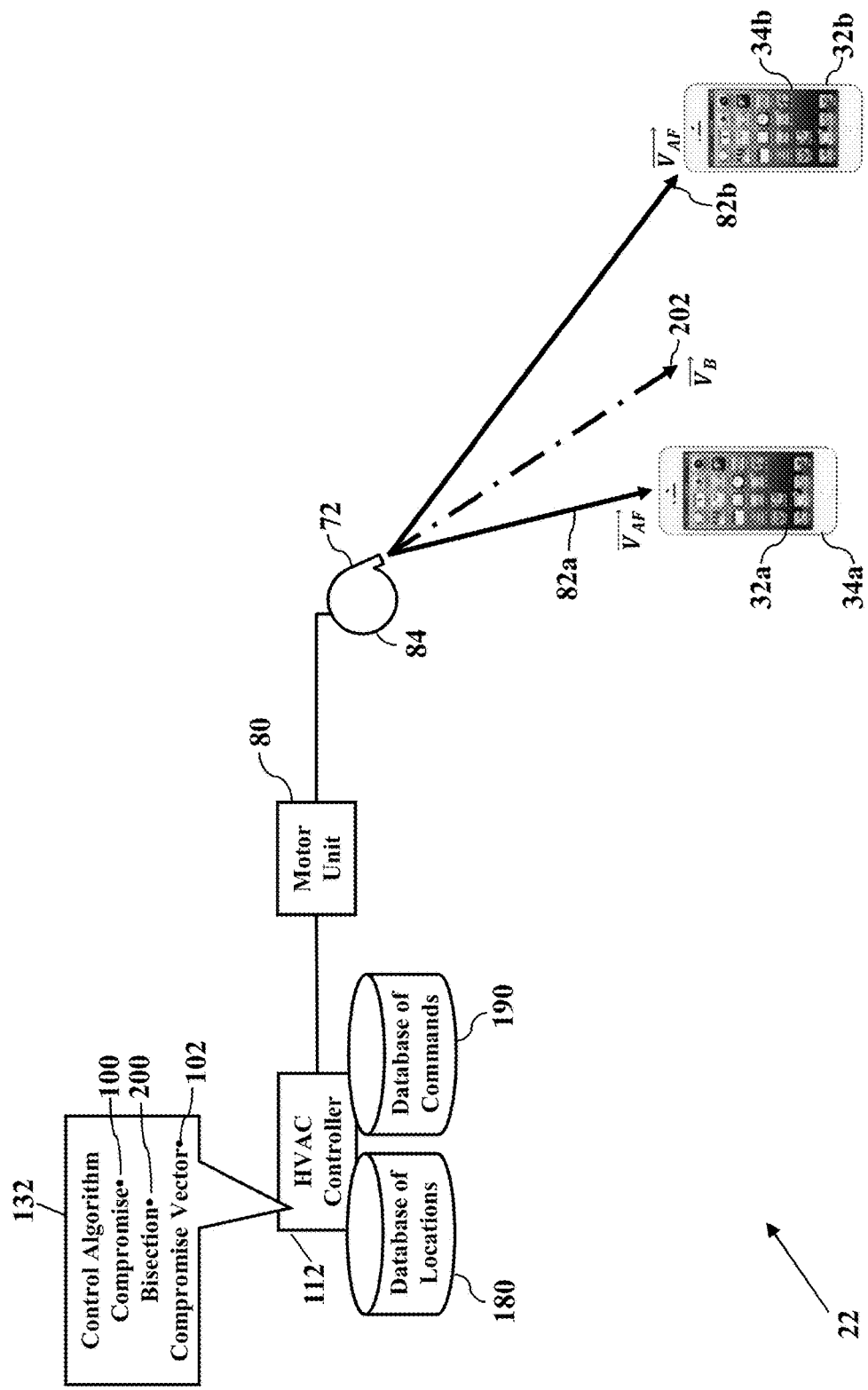
FIGS. 18-19 illustrate an environmental compromise, according to exemplary embodiments.
Figure 19:
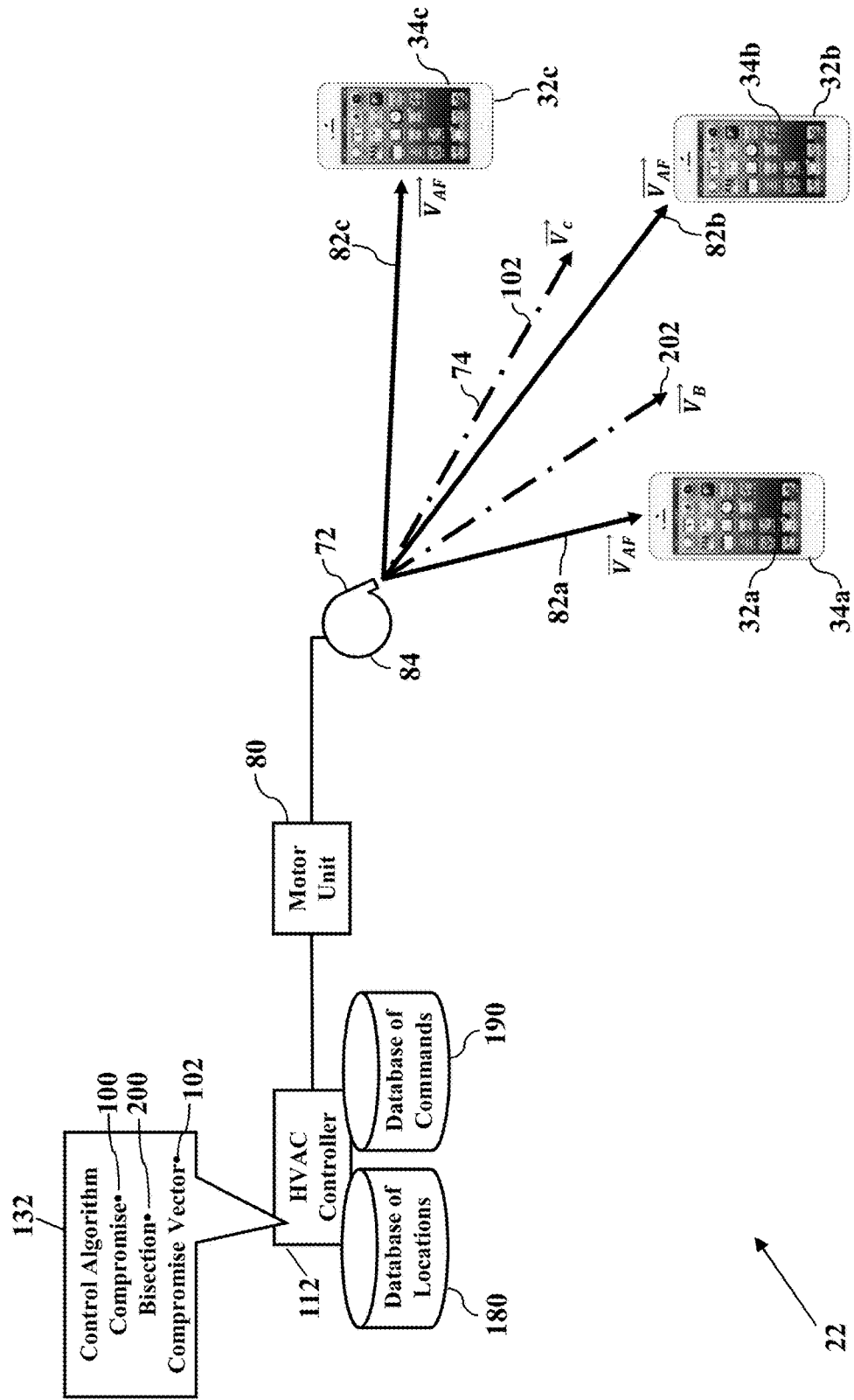

FIGS. 18-19 further illustrate the environmental compromise 100, according to exemplary embodiments. Recall that the air terminal 72 may supply the conditioned air 74 to several occupants. That is, as each occupant may carry her own smartphone 32, the HVAC controller 112 may retrieve or obtain multiple locations 34 and assign the air terminal 72 to service two (2) or more smartphones 32. The HVAC controller 112 may thus determine the air flow vector $\vec{V}_{AF}$ (illustrated as reference numeral 82) associated with each different smartphone 32 (as above explained). Because the HVAC controller 112 has thus determined multiple air flow vectors $\vec{V}_{AF}$ (illustrated as reference numerals 82a, 82b, and 82c), exemplary embodiments may seek the environmental compromise 100 to service multiple users from the single air terminal 72.

Bisection 200 is perhaps the fairest environmental compromise 100. The HVAC controller 112 may recursively bisect the different air flow vectors $\vec{V}_{AF}$ to generate the final or resultant compromise airflow vector $\vec{V}_C$ 102 that best serves the occupants in the room 22. For example, the HVAC controller 112 may select any two (2) or a pair of different air flow vectors $\vec{V}_{AF}$ (such as 82b and 82c) and determine a bisector vector $\vec{V}_B$ (illustrated as reference numeral 202). The bisector vector $\vec{V}_B$ 202 splits the selected pair of different air flow vectors $\vec{V}_{AF}$ 82b and 82c. This bisector vector $\vec{V}_B$ 202 thus represents a middle vector direction or ground between the competing air flow vectors $\vec{V}_{AF}$ 82b and 82c.

FIG. 19 illustrates recursive bisection 200. Here the air terminal 72 may further serve a third smartphone 32c. The HVAC controller 112 may thus determine the corresponding third air flow vector $\vec{V}_{AF}$ 82c and continue the bisection 200 to determine the compromise vector airflow vector $\vec{V}_C$ 102. In other words, the HVAC controller 112 may select any pair of the different air flow vectors $\vec{V}_{AF}$ and determine the bisector vector $\vec{V}_B$ 202. The HVAC controller 112 may then select the remaining third air flow vector $\vec{V}_{AF}$ 82c and determine the resultant bisector as the compromise vector airflow vector $\vec{V}_C$ 202. Indeed, if still more smartphones remain to be served, exemplary embodiments may continue selecting a remaining air flow vector $\vec{V}_{AF}$ 82 and computing the bisector vector $\vec{V}_B$ 202 until all the air flow vectors 82 have been analyzed. The air terminal 72, in simple words, thus outputs the conditioned air 74 in a direction fairest to all the different smartphones 24.

Figure 20:
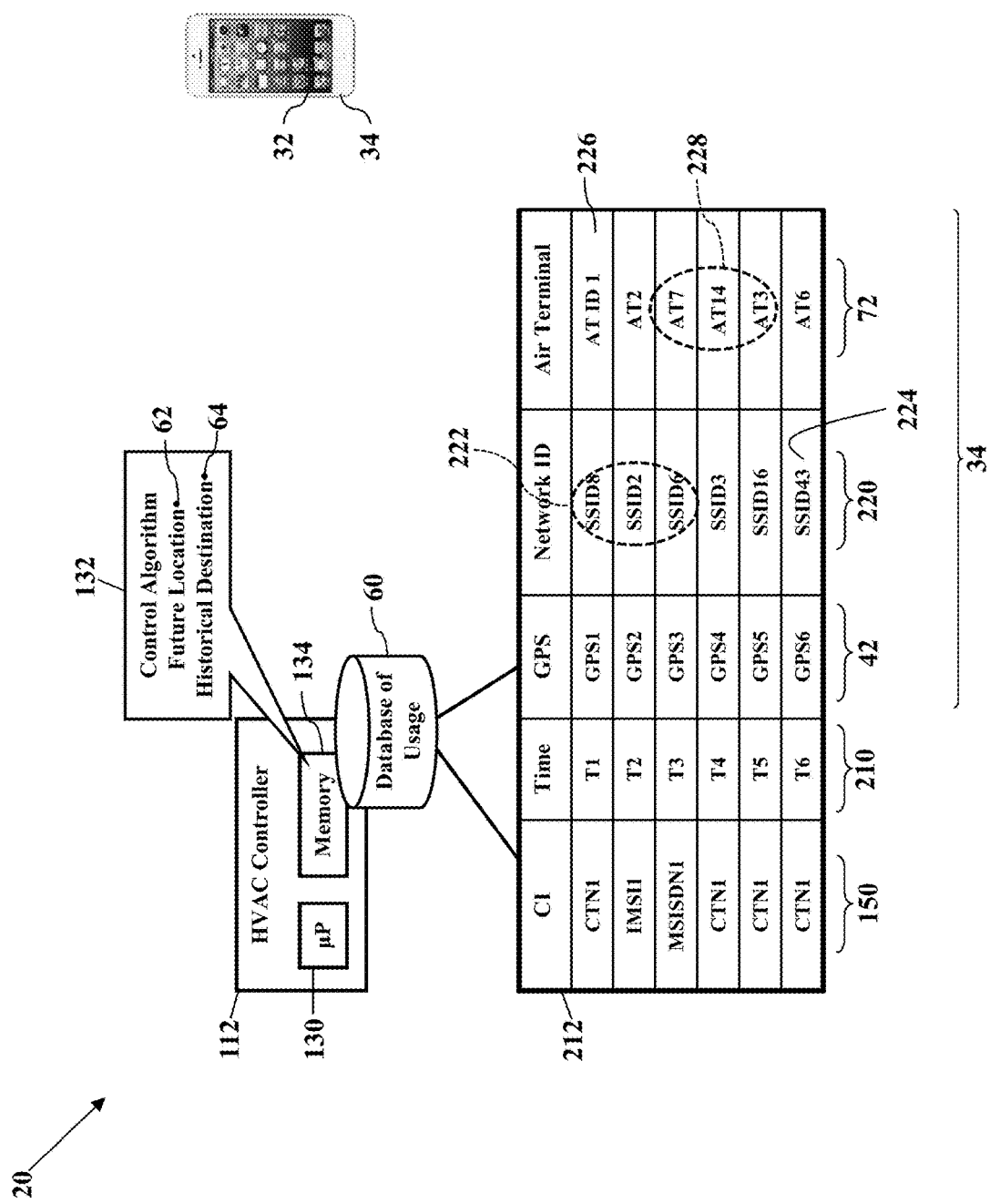
FIGS. 20-21 illustrate locational anticipation, according to exemplary embodiments.
Figure 21:
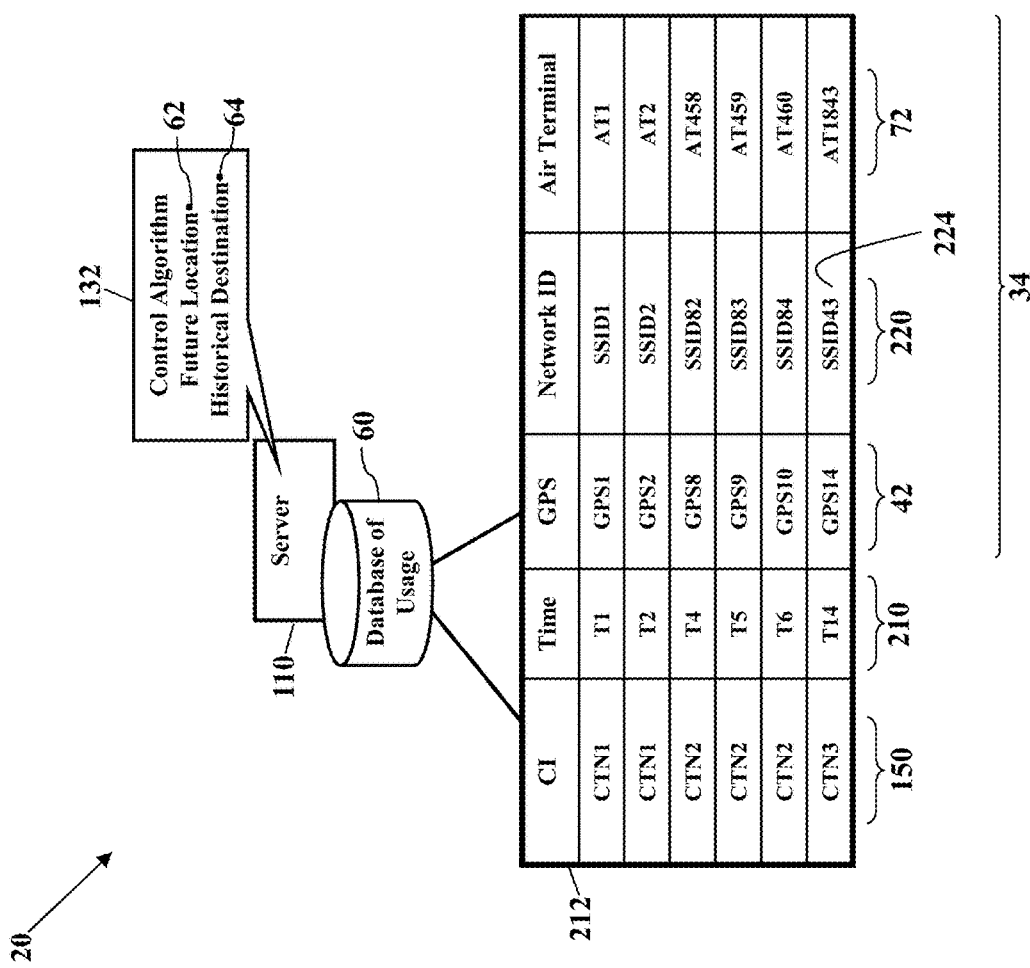

FIGS. 20-21 illustrate locational anticipation, according to exemplary embodiments. As this disclosure above explained, exemplary embodiments may predict where heating or cooling is needed, based on the location 34 associated with the user's smartphone 32. That is, the database 60 of usage may reveal the historical movements and usage of the smartphone 32. These historical entries may be used predict or infer the future location 62, based on historically observed entries (such as the historical destination 64). The climate control system 20 may thus begin conditioning the future location 62 in anticipation of the user's arrival.

The database 60 of usage may thus log a wealth of information. FIG. 20, for example, illustrates GPS tracking. As the smartphone 32 operates, the smartphone 32 may report its GPS information 42. Over time 210, then, the database 60 of usage may log many entries detailing the GPS movements associated with the smartphone 32. FIG. 20 thus illustrates the database 60 of usage as a table 212 that maps or relates different cellular identifiers 150 to their corresponding GPS information 42. Exemplary embodiments may thus compare recent GPS information 42 to the historical entries tracked in the database 60 of usage and make predictions or inferences. For example, when a recent series of GPS information 42 matches a historical series, exemplary embodiments may conclude that the smartphone 32 is on track and proceeding as historically observed. Exemplary embodiments may thus select the future location 62 as an upcoming GPS location in the historical series. The climate control system 20 may thus begin conditioning the future location 62, based on historically observed entries.

FIG. 20 also illustrates network tracking. Here exemplary embodiments may track the location 34 associated with the user's smartphone 32 based on network recognition. As the reader may understand, as the smartphone 32 travels, the smartphone 32 may access many different wireless networks. Exemplary embodiments, then, may additionally or alternatively track the location 34 using network identifiers 220. FIG. 20 thus illustrates the database 60 of usage also mapping the network identifiers 220 reported by the cellular identifier 150. Whenever the user's smartphone 32 establishes communication with a wireless network, the corresponding network identifier 220 and the time 210 may be logged in the database 60 of usage. For example, suppose the user routinely shops at a local shopping center. As the smartphone 32 is carried into a grocery store, drug store, gift shop, and/or restaurant, the smartphone 32 may access different wireless local area networks (WI-FI®) networks serving the different businesses. The smartphone 32 may also detect other identifiers of other networks (such as different cellular network cells). Regardless, the smartphone 32 may request access permission (above explained with reference to FIG. 9). The database 60 of usage may thus log the network identifiers 220 associated with each different network. FIG. 21 thus illustrates a series 222 of service set identifiers (or "SSID") 224 that uniquely identify a sequence of different WIFI® networks. If any one or more recent entries match historical entries, exemplary embodiments may conclude that the smartphone 32 is on track and proceeding as historically observed. Exemplary embodiments may thus select the future location 62 as an upcoming SSID 224 in the historical series. The future location 62 may thus correspond to some physical area served by the wireless network identified by the SSID 224. The climate control system 20 may thus anticipate the smartphone's arrival and begin conditioning the future location 62, based on historically observed entries.

FIG. 20 also illustrates terminal tracking. Here exemplary embodiments may also track the location 34 associated with the user's smartphone 32 based on different air terminals 72. As the smartphone 32 moves, exemplary embodiments may monitor the current location 34 and assign the air terminal 72 (as this disclosure above explains). The different air terminals 72, then, may also be logged in the database 60 of usage. That is, each time any air terminal 72 is assigned to the location 34 associated with the smartphone 32, that assignment may be logged in the database 60 of usage. Exemplary embodiments may thus add an entry representing the time 210 of the assignment and any unique alphanumeric identifier 226 associated with the air terminal 72. Again, then, over time the database 60 of usage will accumulate entries representing a historical repository of the different air terminals 72 serving different mobile devices (such as the different cellular identifiers 150). So, as the smartphone 32 is carried into grocery stores, drug stores, restaurants, homes, and other locations, the database 60 of usage may track the different air terminals 72 that comfort the user. If any one or more recent entries match historical entries, exemplary embodiments may thus conclude that the smartphone 32 is on track and proceeding as historically observed. Exemplary embodiments may thus select the future location 62 as an upcoming air terminal 72 in any matching historical series 228. The climate control system 20 may thus begin conditioning the future location 62, based on historically observed entries.

FIG. 21 illustrates a network centric architecture. Here the database 60 of usage may be a central repository for many different mobile devices. That is, the database 60 of usage may be stored or maintained by the central server 110. Whenever any mobile device is detected, the central server 110 may add an entry to the database 60 of usage. The database 60 of usage may thus log or track the locations 34 associated with many different cellular identifiers 150. The central server 110 may thus predict the future location 62 of any mobile device, based on its historical entries.

Figure 22:
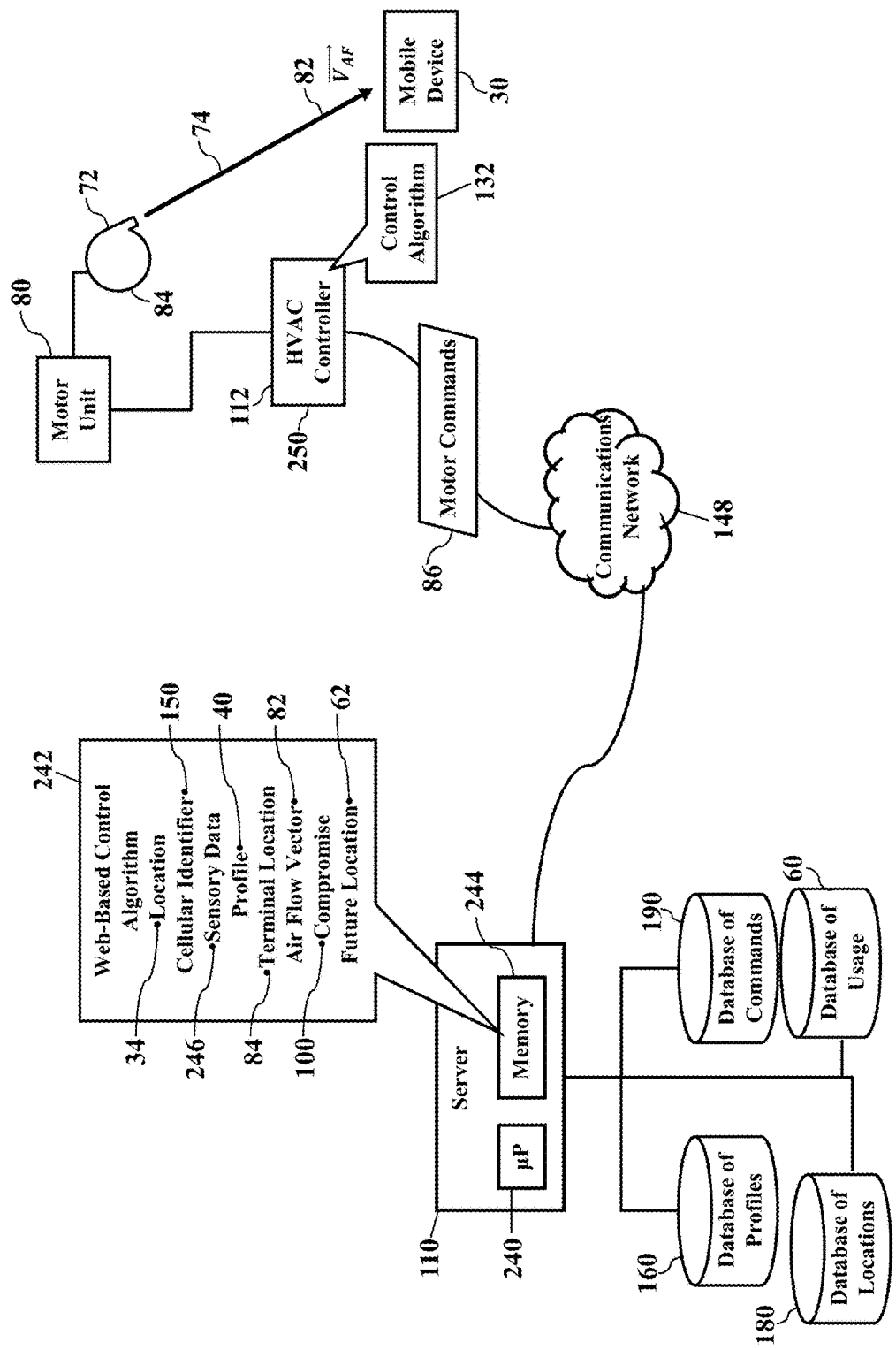
FIG. 22 illustrates network analysis, according to exemplary embodiments.

FIG. 22 illustrates network analysis, according to exemplary embodiments. Here the central server 110 may provide the web-based climate control service for client climate control systems 20. That is, once the central server 110 determines the location 34 associated with any mobile device 30, the central server 110 may condition an area environment at that location 34. The central server 110 has a processor 240 (e.g., "μP"), application specific integrated circuit (ASIC), or other component that executes a web-based control algorithm 242 stored in a memory 244. The web-based control algorithm 242 instructs the processor 240 to perform operations, such as retrieving any sensory data 246 associated with the environmental sensor(s) (illustrated as reference numeral 24 in FIG. 1). The web-based control algorithm 242, for example, may instruct the processor 240 to retrieve the location 34 associated with the cellular identifier 150 associated with the mobile device 30. The server 110 may query the database 160 of profiles and retrieve the corresponding profile 40 (as explained with reference to FIGS. 10-11). The server 110 may query the database 180 of locations and retrieve the terminal location 40 serving the location 34. The server 110 may determine the air flow vector $\vec{V}_{AF}$ (illustrated as reference numeral 82) from the terminal location 84 to the location 34 associated with the mobile device 30 (as explained with reference to FIGS. 4-7 & 16-19). If multiple mobile devise 30 are detected, the central server 110 may implement the environmental compromise 100. The central server 110 may query the database 60 of usage and anticipate the future location 62 (as explained with reference to FIGS. 20-21). At any time, though, the central server 110 may query the database 190 of commands to determine the motor commands 86. The motor commands 86 may be then be sent or routed to the network address associated with the HVAC controller 112. The HVAC controller 112 may then execute the motor commands 86 that control the motor unit 80 to output the conditioned air 74 according to the air flow vector $\vec{V}_{AF}$ 82.

Exemplary embodiments thus include a web-based climate control service. The central server 110 may serve many different climate control systems 20 in a client-server environment. Many different residential and business systems may thus interface with the central server 110 to receive the motor commands 86 for any mobile device 30 that enters an area. Residential and business climate control systems are thus relieved of the perhaps burdensome processing and calculations that are required to follow the movements of the mobile devices 30. Moreover, the central server 110 provides a simple retrofit option for existing systems, which can be years or even decades old. A new climate control system may cost thousands of dollars, which is cost prohibitive, especially when still reliable. Exemplary embodiments, though, merely require retrofit of the motorized air terminal 72 and network interfacing, which is a relatively small cost.

Figure 23:
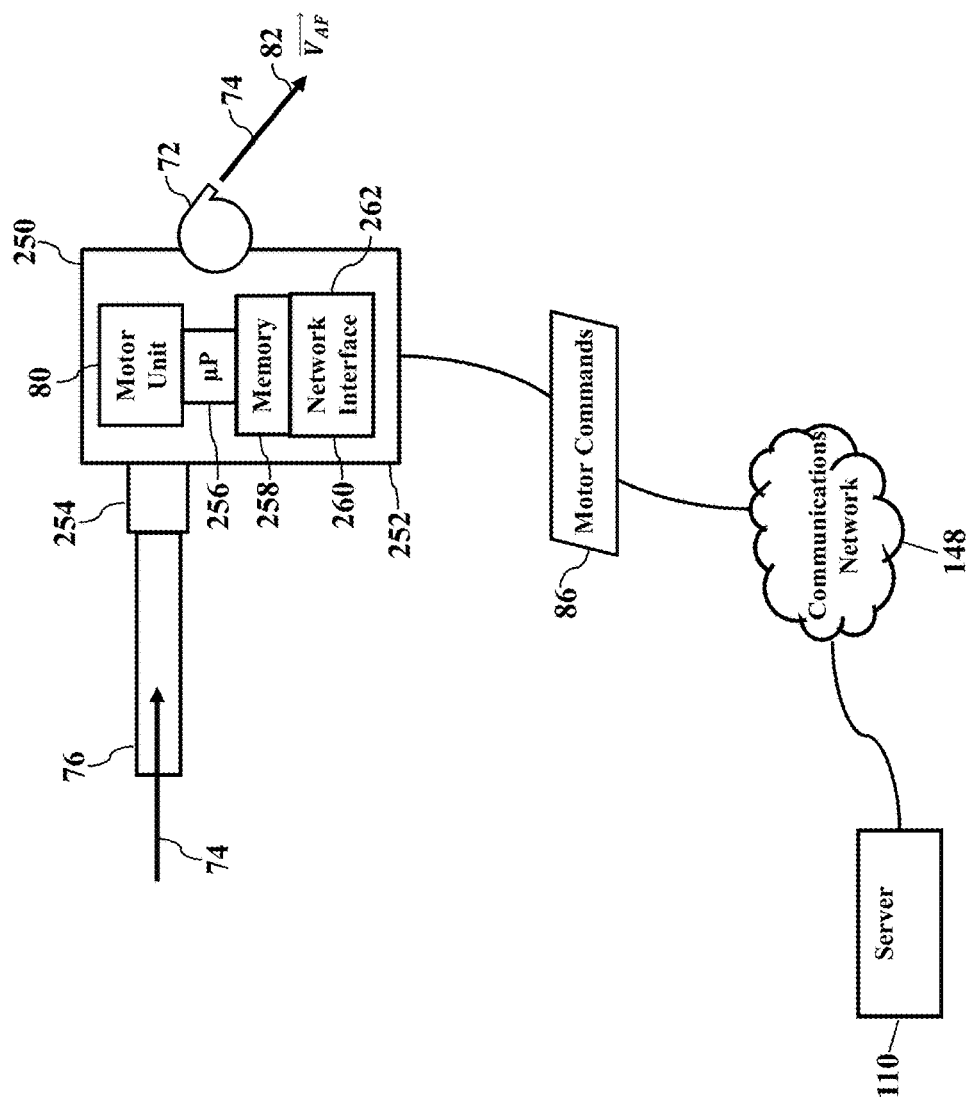
FIG. 23 illustrates a retrofit architecture, according to exemplary embodiments.

FIG. 23 illustrates a retrofit architecture, according to exemplary embodiments. Here the air terminal 72 and the motor unit 80 may be integrated as a single retrofit unit 250. An outer enclosure or housing 252 may thus contain the motor unit 80 that controls the air terminal 72. The housing 252, though, may have an inlet 254 that connects to the existing ductwork 76, thus receiving the conditioned air 74. An internal processor 256 and a memory 258 may control the motor unit 80, and a network interface 260 provides communication with the communications network 148. When the processor 256 receives the motor commands 86, the processor 256 executes the motor commands 86 to rotate or swivel the air terminal 72 to output the conditioned air 74 according to the air flow vector $\vec{V}_{AF}$ 82. The single retrofit unit 250 may thus be easily retrofitted to existing homes and businesses, thus proving location-based HVAC services to any installation. Indeed, the network interface 256 may provide wireless communications capability (e.g., cellular, BLUETOOTH or ISM, or IEEE 802), thus making installation and compatibility even easier. The single retrofit unit 250 may thus be associated with a unique network address 262, thus allowing addressable communications.

Figure 24:
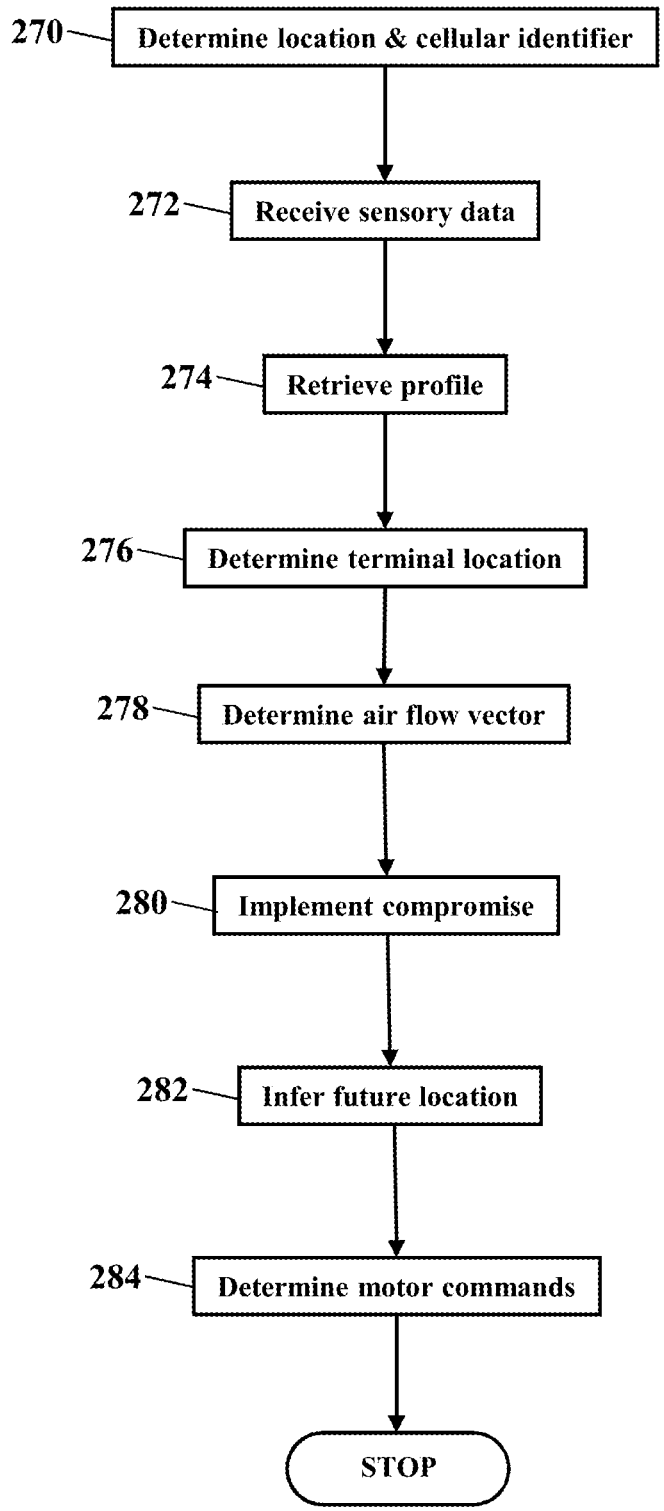
FIG. 24 is a flowchart illustrating a method or algorithm for directional HVAC service, according to exemplary embodiments.

FIG. 24 is a flowchart illustrating a method or algorithm for directional HVAC service, according to exemplary embodiments. The location 34 associated with a cellular identifier 150 is determined (Block 270). The sensory data 246 from the sensor 24 is received (Block 272). The profile 40 is retrieved (Block 274). The terminal location 84 is determined (Block 276) and the air flow vector 82 is determined (Block 278). The compromise 100 is implemented, if needed (Block 280). The future location 62 is inferred (Block 282). The motor commands 86 are determined (Block 284).

Figure 25:
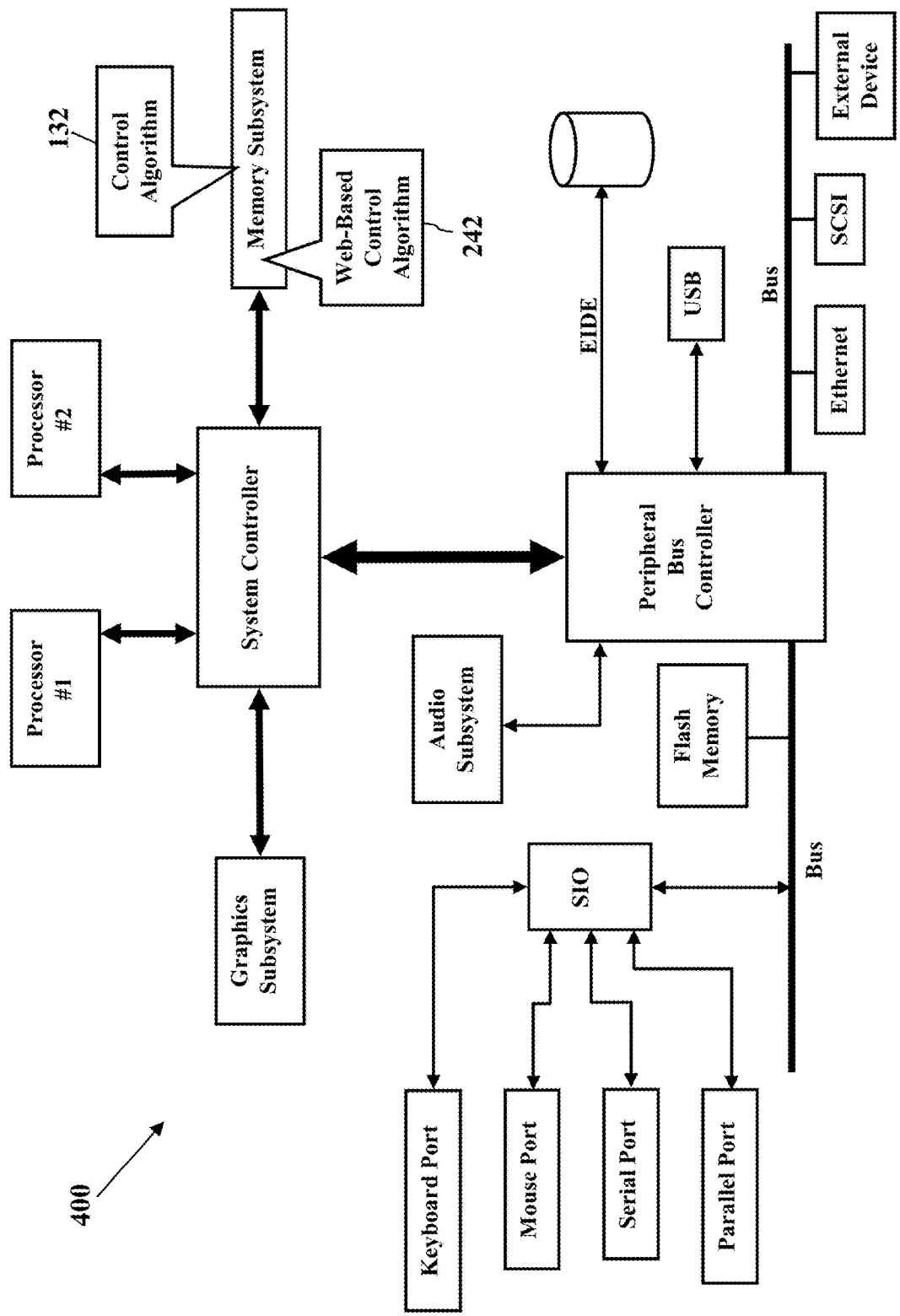
FIGS. 25-26 depict still more operating environments for additional aspects of the exemplary embodiments.

FIG. 25 is a schematic illustrating still more exemplary embodiments. FIG. 25 is a more detailed diagram illustrating a processor-controlled device 400. As earlier paragraphs explained, the control algorithm 132 and/or the web-based control algorithm 242 may partially or entirely operate in any mobile or stationary processor-controlled device. FIG. 25, then, illustrates the control algorithm 132 and/or the web-based control algorithm 242 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 26:
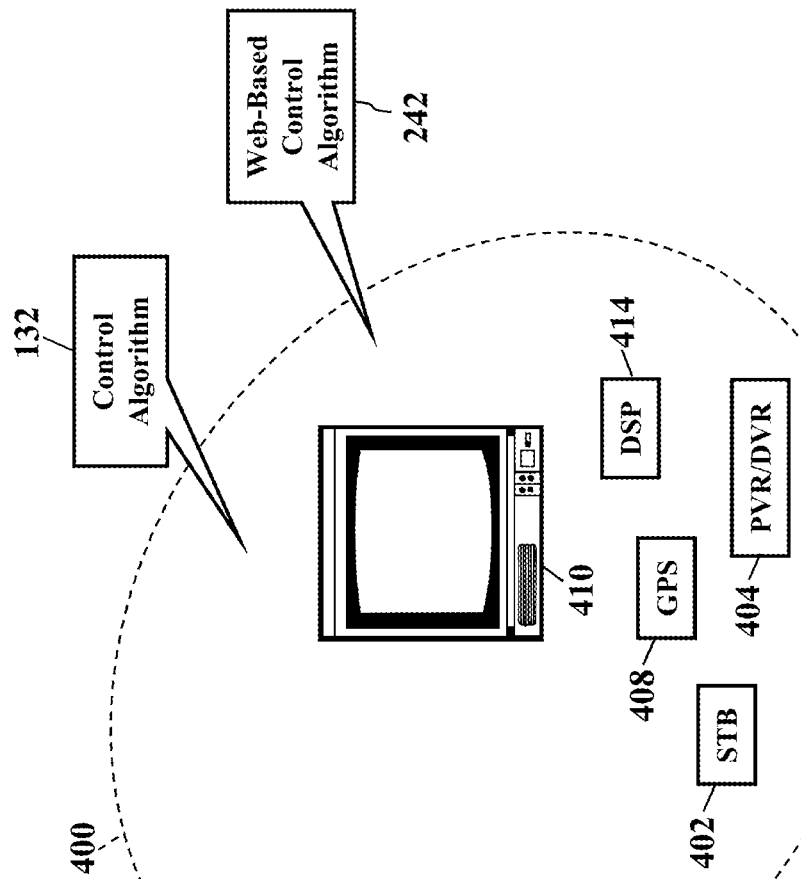

FIG. 26 depicts other possible operating environments for additional aspects of the exemplary embodiments. FIG. 26 illustrates the control algorithm 132 and/or the web-based control algorithm 242 operating within various other processor-controlled devices 400. FIG. 26, for example, illustrates that the control algorithm 132 and/or the web-based control algorithm 242 may entirely or partially operate within a set-top box ("STB") (402), a personal/digital video recorder (PVR/DVR) 404, a Global Positioning System (GPS) device 408, an interactive television 410, or any computer system, communications device, or processor-controlled device utilizing any of the processors above described and/or a digital signal processor (DP/DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be applied to any signaling standard. Mobile devices operate using one or more standards and frequencies. For example, many cellular mobile devices may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

FIGS. 27-30 illustrate alternative climate control systems, according to exemplary embodiments. The above paragraphs primarily describe exemplary embodiments using a forced-air climate control system 20. That is, exemplary embodiments may monitor the location 34 associated with the user's mobile device 30 and aim conditioned air from the air terminal 72.

Figure 27:
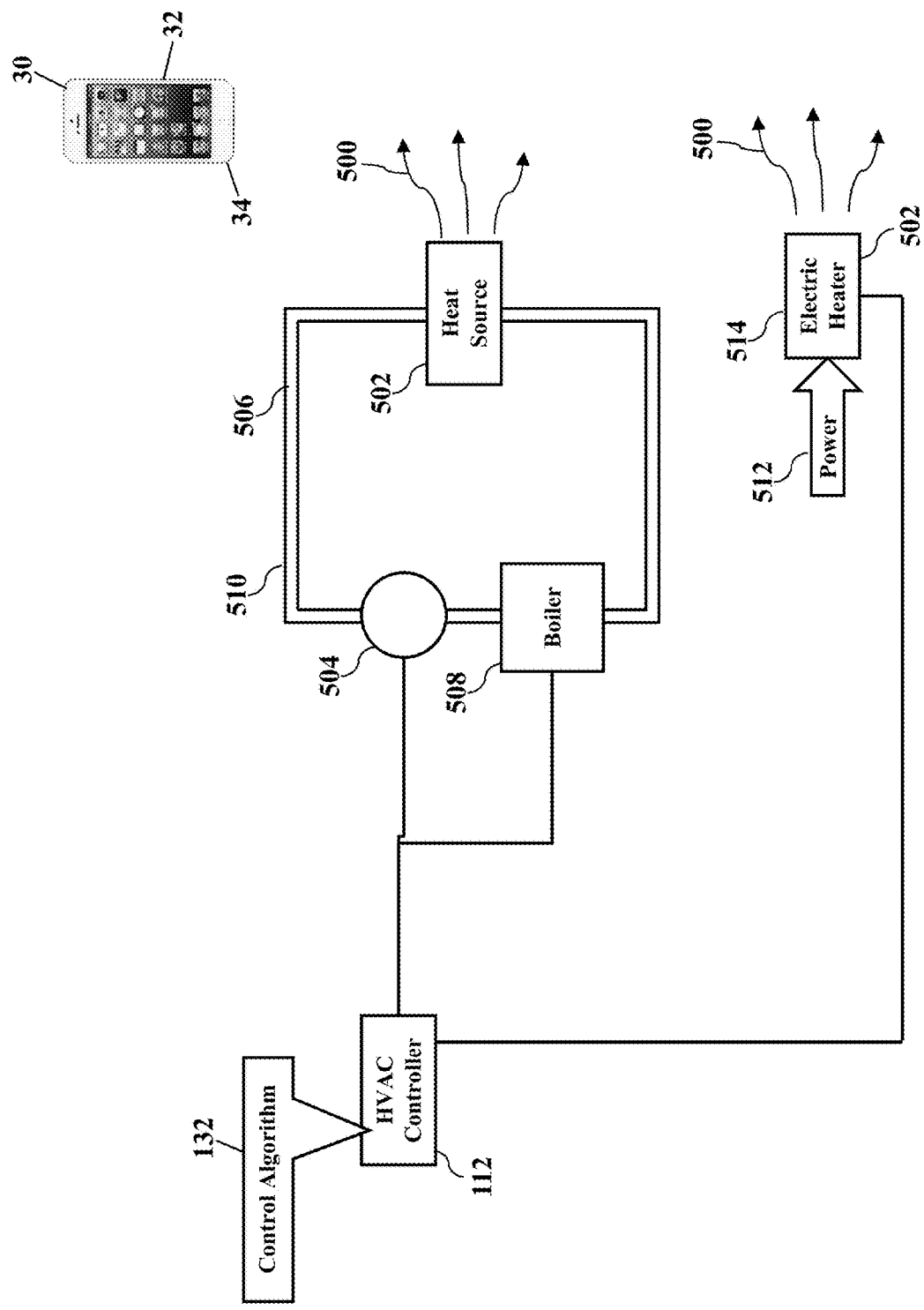
FIGS. 27-30 illustrate alternative climate control systems, according to exemplary embodiments.

FIG. 27 thus applies this basic concept to any climate control system 20. FIG. 27, for example, illustrates radiant heat 500. Here the climate control system 20 may have one or more radiant heat sources 502 that emit the radiant heat 500 into the environment (such as the room 22 illustrated in FIG. 1). The climate control system 20 may thus have a hydraulic pump 504 that circulates a hot fluid 506 (perhaps water, steam, or non-toxic ethanol or propylene glycol) from a boiler 508 through lines 510 to the heat sources 502. However, the climate control system 20 may additionally or alternative supply, control, and/or direct electrical power 512 (e.g., current and voltage) to an electrical heater 514 that emits the radiant heat 500. Regardless, exemplary embodiments may still select the radiant heat sources 502 based on the location 34 associated with the user's mobile device 30.

Figure 28:
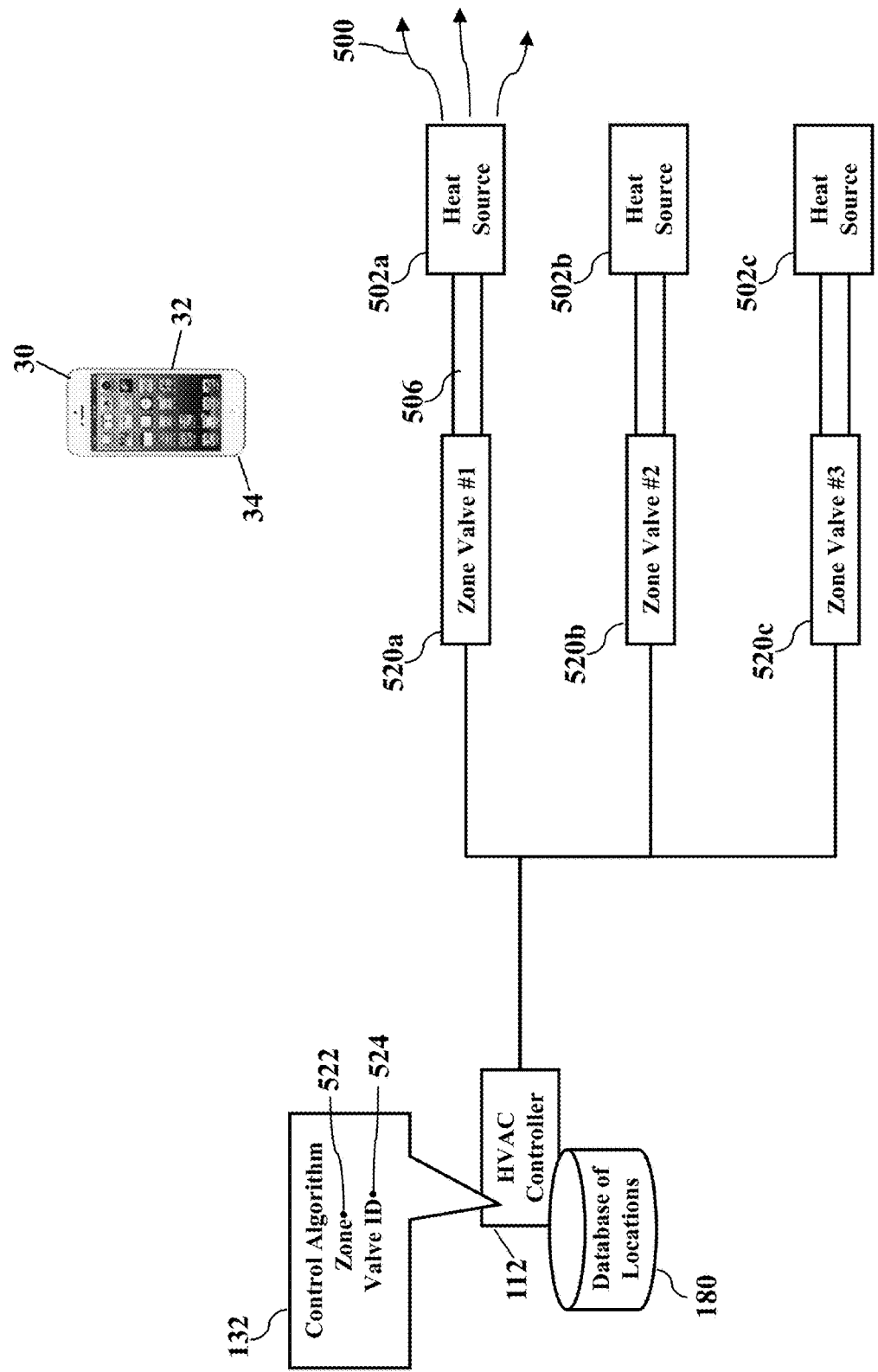

FIG. 28 illustrates zone valves 520a-520c. Here the HVAC controller 112 may select one or more of the zone valves 520 according to the location 34 associated with the user's mobile device 30. Each zone valve 520 may electromechanically open (such as when activated by the HVAC controller 112) to flow the hot fluid 506 to a corresponding heat source (such as 502a). Each different zone valve 520, in other words, heats a corresponding different area or zone. Here, though, the zone valves 520 may be individually activated according to the location 34 associated with the user's mobile device 30. Each different zone valve 520, for example, may be associated with a different zone 522. Each zone 522 may be defined according to any identifier, such as a different room in a home or building. Once the location 34 is known, the HVAC controller 112 may query the database 180 of locations and retrieve the corresponding zone 522 and/or valve identifier ("valve ID") 524 associated with the zone valve 520. The database 180 of locations may thus include electronic database associations between the different locations 34 and different zones 522 and different valve identifiers 524. The HVAC controller 112 thus determines the zone 522 and the valve identifier 524 that is/are defined for the location 34 associated with the user's mobile device 30. The HVAC controller 112 may thus activate or open the zone valve 520a, thus flowing the hot fluid 506 to emit the radiant heat 500 from the corresponding heat source 502a. Should the user's mobile device 30 move to a different location 34 that corresponds with a different zone 522, the HVAC controller 112 may be programmed to electromechanically close the zone valve 520a, thus effectively stopping the radiant heat 500 from the corresponding heat source 502a.

Figure 29:
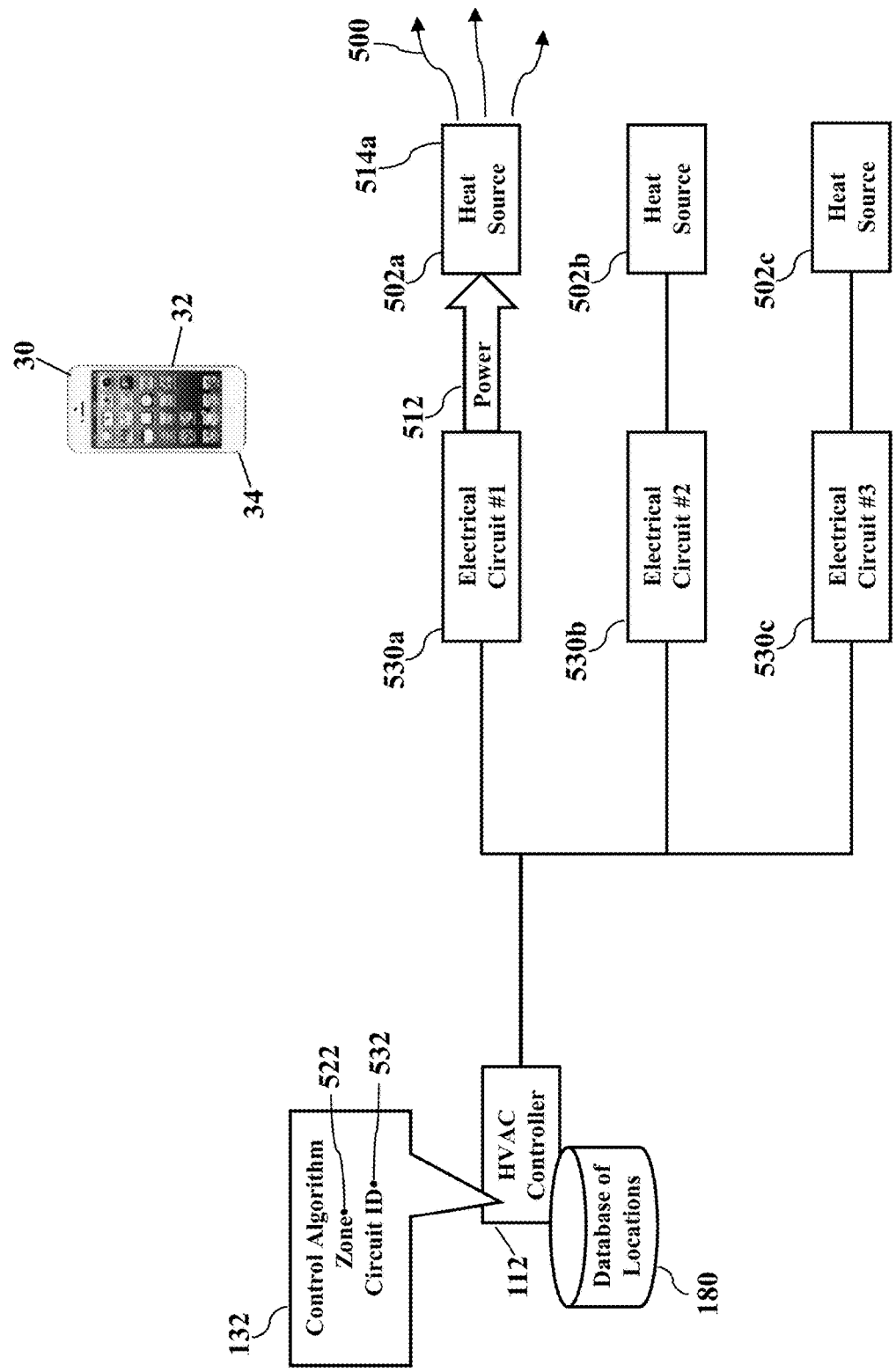

FIG. 29 illustrates electrical circuits 530a-530c. Here the HVAC controller 112 may select and/or energize one or more of the electrical circuits 530 according to the location 34 associated with the user's mobile device 30. Each electrical circuit 530 may thus heat a corresponding different area or zone 522. The HVAC controller 112, for example, may energize a solenoid and/or close a switch that causes the electrical power 512 to flow through the corresponding electrical circuit 530 to the corresponding heat source 502. Once the location 34 is known, the HVAC controller 112 may query the database 180 of locations and retrieve the corresponding zone 522 and/or circuit identifier ("circuit ID") 532. The database 180 of locations may thus include electronic database associations between the different locations 34, the different zones 522, and different circuit identifiers 532. The HVAC controller 112 thus determines the zone 522 and the circuit identifier 532 that is/are defined for the location 34 associated with the user's mobile device 30. The HVAC controller 112 may thus activate the corresponding electrical circuit 530a, thus providing the electrical power 512 to the electric heater 514a. Again, should the user's mobile device 30 move to a different location 34 that corresponds with a different zone 522, the HVAC controller 112 may additionally or alternatively energize a different electrical circuit 530.

Figure 30:
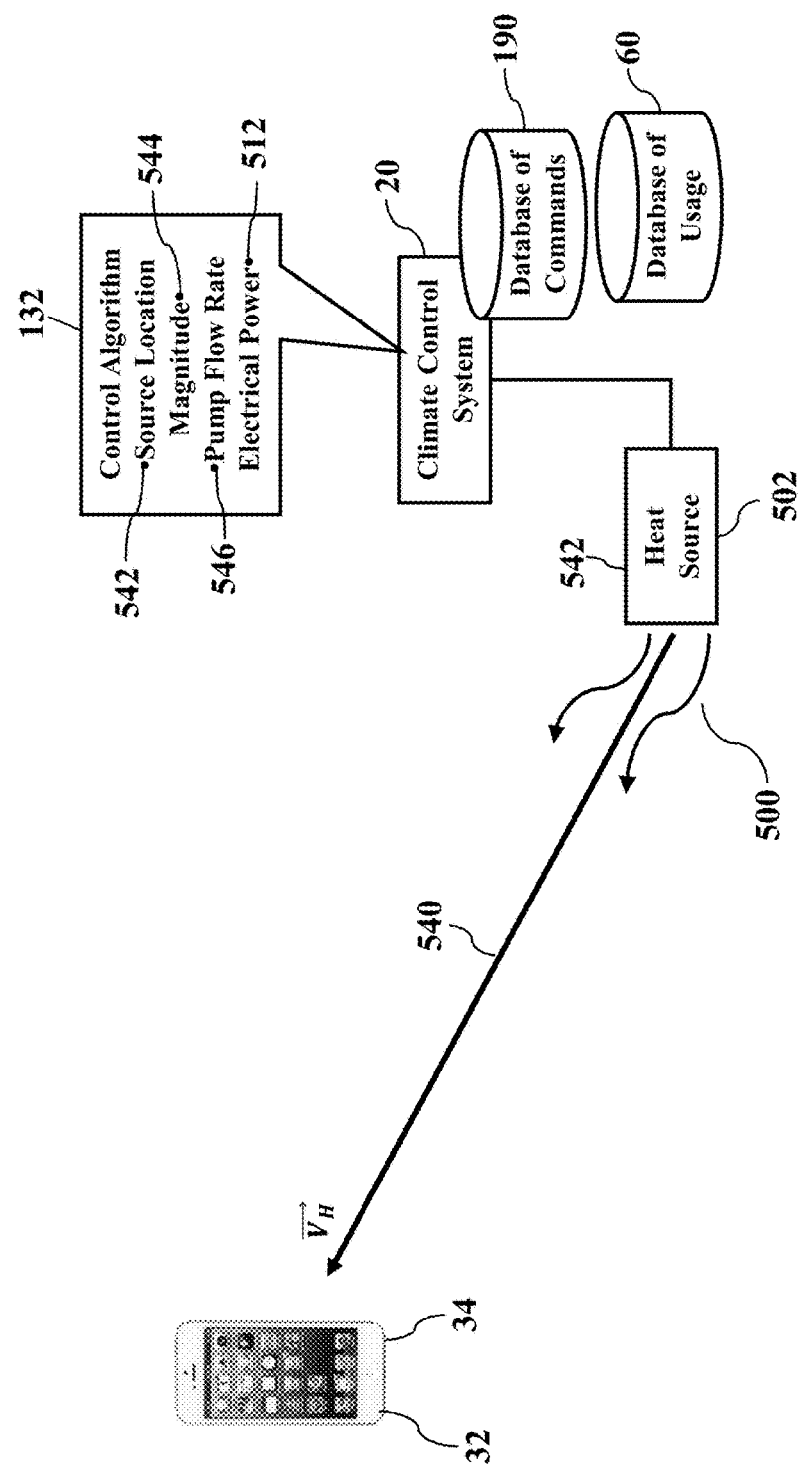

FIG. 30 illustrates vector determinations. Here exemplary embodiments may determine a vector to the location 34 associated with the smartphone 32. FIG. 30, for example, illustrates a heating vector $\vec{V_H}$ (illustrated as reference numeral 540). Once the location 34 is known, exemplary embodiments may query the database 180 of locations and retrieve a matching source location 542. The source location 542 represents any data or information associated with the climate control system 20 that should be activated, based on the location 34 associated with the smartphone 32. FIG. 30 thus illustrates the heating vector $\vec{V_H}$ 540 having a beginning or origination at the source location 542 associated with the heat source 502. The heating vector $\vec{V_H}$ 540 may terminate or end at the location 34 associated with the smartphone 32. The climate control system 20 may then generate commands based on the heating vector $\vec{V_H}$ 540.

Exemplary embodiments may tailor the radiant heat 500 to the heating vector $\vec{V_H}$ 540. For example, the climate control system 20 may control a flow volume of the fluid (illustrated as reference numeral 506 in FIGS. 27-28) according to a magnitude 544 associated with the heating vector $\vec{V_H}$ 540. That is, the control algorithm 132 may determine $|\vec{V_H}|$ 544 and compare to the database 190 of commands. Here, though, the database 190 of commands may have electronic database associations between different magnitudes 544 of the heating vector $\vec{V_H}$ 540 and different pump flow rates 546 associated with the pump (illustrated as reference numeral 504 in FIG. 27). The control algorithm 132 may thus retrieve the pump flow rate 546 having an electronic database association with the magnitude 544 associated with the heating vector $\vec{V}_H$ 540. So, in simple words, if the magnitude $|\vec{V}_H|$ 544 has a large value, then perhaps a greater pump flow rate 546 is required in order to effectively heat the location 34 associated with the smartphone 32. If the magnitude $|\vec{V}_H|$ 544 is small, then perhaps a low pump flow rate 546 will comfortably heat the user at the location 34 associated with the smartphone 32.

Exemplary embodiments may also vary the electrical power 512. Here exemplary embodiments may determine the electrical power 512 applied to the electrical heater (illustrated as reference numeral 514 in FIGS. 27 & 29) based on the magnitude 544 associated with the heating vector $\vec{V}_H$ 540. The database 190 of commands may thus have electronic database associations between the different magnitudes 544 of the heating vector $\vec{V}_H$ 540 and different electrical powers 512 applied to the electrical circuit 530 associated with the corresponding electrical heater 514. The control algorithm 132 may thus retrieve the electrical power 512 having an electronic database association with the magnitude $|\vec{V}_H|$ 544. Again, if the magnitude $|\vec{V}_H|$ 544 has a large value, then perhaps a greater electrical power 512 is required in order to effectively radiate heat to the location 34 associated with the smartphone 32. However, if the magnitude $|\vec{V}_H|$ 544 is small, then perhaps a low electrical power 512 will comfortably heat the user, thus reducing heating costs.

Exemplary embodiments include many other features and services. For example, if multiple mobile devices are detected, exemplary embodiments may apply the group conditioning, implement the environmental compromise 100, and handoff to different heat sources (as better explained with reference to FIGS. 16-19). Exemplary embodiments may also anticipate heat sources and track network usage, as explained with reference to the database 60 of usage (as better explained with reference to FIGS. 20-21).

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for locational environmental control, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a climate control system, locations of mobile devices;
   identifying, by the climate control system, an air terminal associated with the locations of the mobile devices;
   determining, by the climate control system, air flow vectors from the air terminal to each one of the locations of the mobile devices;
   recursively bisecting, by the climate control system, a pair of the air flow vectors to determine a compromise vector; and
   outputting, by the climate control system, an air from the air terminal according to the compromise vector.

2. The method of claim 1, further comprising aiming the air terminal according to the compromise vector.

3. The method of claim 1, further comprising commanding the air terminal to output the air according to the compromise vector.

4. The method of claim 1, further comprising retrieving a command associated with the compromise vector.

5. The method of claim 4, further comprising sending the command to the air terminal to output the air according to the compromise vector.

6. The method of claim 1, further comprising conditioning the air.

7. The method of claim 1, further comprising determining a temperature associated with at least one of the mobile devices.

8. A method, comprising:
   receiving, by a server providing a cloud-based climate control service, locations of mobile devices;
   identifying, by the server providing the cloud-based climate control service, an air terminal that serves the locations;
   determining, by the server providing the cloud-based climate control service, air flow vectors from the air terminal to each one of the locations;
   recursively bisecting, by the server providing the cloud-based climate control service, a pair of the air flow vectors to determine a compromise vector to output air from the air terminal to the mobile devices; and
   sending, by the server providing the cloud-based climate control service, the compromise vector to a climate control system.

9. The method of claim 8, further comprising sending the compromise vector to at least one of the mobile devices.

10. The method of claim 8, further comprising retrieving a command associated with the compromise vector.

11. The method of claim 10, further comprising sending the command to the climate control system.

12. The method of claim 10, further comprising sending the command to at least one of the mobile devices.

13. The method of claim 10, further comprising sending the command to a network address associated with the climate control system.

14. A system, comprising:
   a hardware processor; and
   a memory device, the memory device storing instructions, the instructions when executed causing the hardware processor to perform operations, the operations comprising:
      receiving a command associated with a compromise vector, wherein each air flow vector in a pair of air flow vectors originates at a same air terminal and is directed to a location of a mobile device, and wherein the compromise vector is determined by recursively bisecting the pair of air flow vectors; and
      commanding the same air terminal to output an air flow according to the compromise vector by sending the command to the same air terminal.

15. The system of claim 14, wherein the operations further comprise executing the command.

16. The system of claim 14, wherein the operations further comprise aiming the same air terminal according to the compromise vector.

17. The system of claim 14, wherein the operations further comprise aiming the same air terminal according to the compromise vector.

18. The system of claim 14, wherein the operations further comprise conditioning the air.

19. The system of claim 14, wherein the operations further comprise determining a temperature associated with at least one of the mobile devices.

20. The system of claim 14, wherein the operations further comprise sending the command to a network address associated with a climate control system.

* * * * *